US012727047B2

(12) United States Patent
Chauhan et al.

(10) Patent No.: US 12,727,047 B2
(45) Date of Patent: Sep. 1, 2026

(54) USING STORED MEASUREMENT RESULTS FOR RADIO LINK FAILURE RECOVERY

(71) Applicant: QUALCOMM Incorporated, San Diego, CA (US)

(72) Inventors: Keerti Chauhan, Hyderabad (IN); Madhav Dhabalia, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 18/514,443

(22) Filed: Nov. 20, 2023

(65) Prior Publication Data

US 2025/0168913 A1 May 22, 2025

(51) Int. Cl.
*H04W 76/19* (2018.01)
*H04W 24/10* (2009.01)

(52) U.S. Cl.
CPC .......... *H04W 76/19* (2018.02); *H04W 24/10* (2013.01)

(58) Field of Classification Search
CPC . H04W 76/19; H04W 24/10; H04W 36/0033; H04W 48/16
See application file for complete search history.

(56) References Cited

U.S. PATENT DOCUMENTS

2022/0346001 A1* 10/2022 Hu ...................... H04J 11/0069
2025/0247783 A1* 7/2025 Lee ...................... H04W 48/20

OTHER PUBLICATIONS

3GPP TSG-RAN WG2 Meeting #123bis R2-2311608, Xiamen, China, Oct. 9-13, 2023 (Year: 2023).*
3GPP TSG-RAN WG2 Meeting #111-e R2-2007585 Electronic Meeting, Aug. 17-28, 2020 (Year: 2020).*
3GPP TSG-RAN WG2 Meeting#123 R2-230nnnn Toulouse, Aug. 21-25, 2023 (Year: 2023).*

* cited by examiner

*Primary Examiner* — Charles C Jiang
*Assistant Examiner* — Margaret Marie Anderson
(74) *Attorney, Agent, or Firm* — Harrity & Harrity, LLP

(57) ABSTRACT

Various aspects of the present disclosure generally relate to wireless communication. In some aspects, a user equipment (UE) may identify a frequency scan order associated with a radio link failure (RLF) recovery procedure, wherein identifying the frequency scan order includes identifying a position, in the frequency scan order, of a frequency associated with a last-acquired cell by using a measurement result of the frequency associated with the last-acquired cell that is stored in a measurement database. The UE may perform the RLF recovery procedure by scanning one or more frequencies in the frequency scan order. Numerous other aspects are described.

30 Claims, 13 Drawing Sheets

510 ACQ_DB Entries:

| Freq. | Band | DL BW |
|---|---|---|
| F1 | B1 | 20 MHz |
| F2 | B2 | 100 MHz |
| F3 | B3 | 20 MHz |
| F4 | B4 | 40 MHz |
| F5 | B5 | 80 MHz |
| F6 | B5 | 100 MHz |
| F7 | B2 | 100 MHz |

512 MDB Entries:

| Freq. | Cell ID | RSRP (dBm) |
|---|---|---|
| F1 | C1 | -120 |
| F3 | C2 | -95 |
| F5 | C3 | -100 |
| F4 | C4 | -90 |
| F7 | C5 | -104 |
| F2 | C6 | -85 |
| F8 | C7 | -122 |
| F6 | C8 | -110 |

514 Frequency Scan Order Sorting

| Freq. | DL BW | RSRP (dBm) |
|---|---|---|
| F2 | 100 MHz | -85 |
| F7 | 100 MHz | -104 |
| F5 | 80 MHz | -100 |
| F4 | 40 MHz | -90 |
| F3 | 20 MHz | -95 |
| F6 | 100 MHz | -110 |
| F1 | 20 MHz | -120 |

500

538
Serving Cell Frequency: F1
SIB4_DB: F3, F5, F4, F7, F9
SCell_DB: F7, F6, F10

540
MDB Entries (idle mode):

| MDB | Freq. | Cell ID | RSRP (dBm) |
|---|---|---|---|
| Serving Cell | F1 | C1 | -120 |
| Available SIB4 Neighbors Captured in MDB | F3 | C2 | -95 |
| | F5 | C3 | -100 |
| | F4 | C4 | -90 |
| | **F7** | C5 | -110 |
| | F9 | Not present | |

542
UE transitions to connected mode and receives MOs (F7, F6, F10)

544
MDB Entries (connected mode):

| MDB | Freq. | Cell ID | RSRP (dBm) |
|---|---|---|---|
| Serving Cell | F1 | C1 | -120 |
| Available SIB4 Neighbors Captured in MDB | F3 | C2 | -95 |
| | F5 | C3 | -100 |
| | F4 | C4 | -90 |
| | **F7** | C5 | -110 |
| Remaining MOs not prev. in MDB | F10 | C9 | -127 |
| | F6 | Not present | |

USING STORED MEASUREMENT RESULTS FOR RADIO LINK FAILURE RECOVERY

FIELD OF THE DISCLOSURE

Aspects of the present disclosure generally relate to wireless communication and to techniques and apparatuses for using stored measurement results for radio link failure recovery.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying a frequency scan order associated with a radio link failure (RLF) recovery procedure, wherein identifying the frequency scan order includes identifying a position, in the frequency scan order, of a frequency associated with a last-acquired cell by using a measurement result of the frequency associated with the last-acquired cell that is stored in a measurement database; and performing the RLF recovery procedure by scanning one or more frequencies in the frequency scan order.

In some aspects, an apparatus for wireless communication at a UE includes one or more memories; and one or more processors, coupled to the one or more memories, configured to cause the UE to: identify a frequency scan order associated with an RLF recovery procedure, wherein identifying the frequency scan order includes identifying a position, in the frequency scan order, of a frequency associated with a last-acquired cell by using a measurement result of the frequency associated with the last-acquired cell that is stored in a measurement database; and perform the RLF recovery procedure by scanning one or more frequencies in the frequency scan order.

In some aspects, a non-transitory computer-readable medium storing a set of instructions for wireless communication includes one or more instructions that, when executed by one or more processors of a UE, cause the UE to: identify a frequency scan order associated with an RLF recovery procedure, wherein identifying the frequency scan order includes identifying a position, in the frequency scan order, of a frequency associated with a last-acquired cell by using a measurement result of the frequency associated with the last-acquired cell that is stored in a measurement database; and perform the RLF recovery procedure by scanning one or more frequencies in the frequency scan order.

In some aspects, an apparatus for wireless communication includes means for identifying a frequency scan order associated with an RLF recovery procedure, wherein identifying the frequency scan order includes identifying a position, in the frequency scan order, of a frequency associated with a last-acquired cell by using a measurement result of the frequency associated with the last-acquired cell that is stored in a measurement database; and means for performing the RLF recovery procedure by scanning one or more frequencies in the frequency scan order.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5G are diagrams illustrating an example associated with using stored measurement results for RLF recovery, in accordance with the present disclosure.

DETAILED DESCRIPTION

Figure 1:
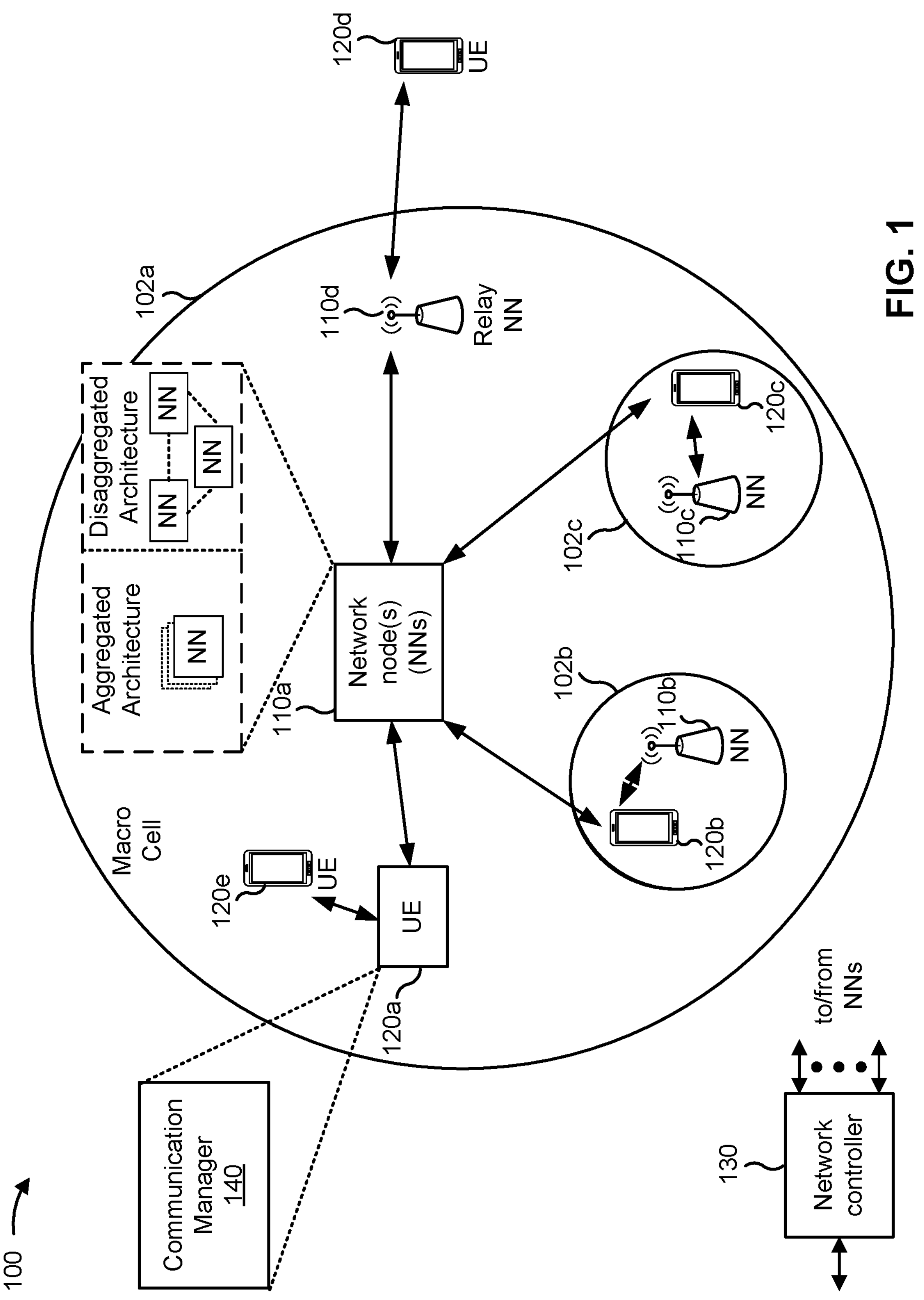
FIG. 1 is a diagram illustrating an example of a wireless network, in accordance with the present disclosure.

In some examples, a user equipment (UE) may experience radio link failure (RLF), resulting in a poor user experience. Accordingly, the UE may be configured with a set of radio link monitoring reference signal (RLM-RS) resources, such as for a purpose of measuring neighboring cells as candidate cells to perform a handover procedure in order to avoid RLF. In such examples, a UE 120 may perform measurements on the neighboring cells using the RLM-RS resources, and/or may store the measurement results in a measurement database (MDB). In some examples, after experiencing RLF, the UE may perform an RLF recovery procedure, such as for a purpose of reconnecting to the previous serving cell or a neighboring cell. For example, based at least in part on experiencing RLF, the UE may perform an acquisition scan (e.g., the UE may acquire time and/or synchronization with a cell using a synchronization signal block (SSB)) for multiple frequencies in order to locate a suitable frequency (e.g., cell) for establishing a radio link, thereby recovering from RLF. The UE may be configured to scan the frequencies according to a certain frequency scan order, which may prioritize a frequency associated with a last-acquired cell (e.g., a frequency that was a serving cell of the UE prior to RLF).

However, often the frequency associated with the last-acquired cell may be a relatively poor candidate for an RLF recovery procedure because the frequency may have been relatively weak, leading to the RLF in the first place. As a result, the UE may spend time and consume power, computing, and network resources scanning the frequency, even though the frequency is a weak RLF recovery candidate. This may result in an RLF recovery procedure that is associated with high latency and/or high resource consumption. Moreover, certain RLF recovery procedures may result in the UE ultimately connecting to a cell associated with a relatively small bandwidth, resulting in communications between the UE and a network node that are associated with high latency, low throughput, and/or overall inefficient usage of network resources.

Some techniques and apparatuses described herein enable optimized RLF recovery procedures. In some aspects, a UE may be configured to identify a frequency scan order associated with an RLF recovery procedure using measurement results stored in an MDB at the UE. For example, the UE may identify a position of a frequency associated with a last-acquired cell in a frequency scan order by using a measurement result of the frequency associated with the last-acquired cell that is stored in the MDB. Additionally, or alternatively, the UE may sort high-speed-train (HST) frequencies using measurement results stored in the MDB, such as by placing HST frequencies associated with relatively strong cells higher in the frequency scan order than HST frequencies associated with a relatively weak cells. In some aspects, the UE may be configured to sort certain frequencies in the frequency scan order according to bandwidth size, such that frequencies associated with large bandwidths are scanned prior to frequencies associated with small bandwidths. Moreover, in some aspects the UE may be configured to maintain previously acquired measurement results in the MDB even if the UE receives a new measurement configuration, such that the measurement results may be later used for identifying an optimal frequency scan order. As a result, an RLF recovery procedure with the optimized frequency scan order (e.g., a frequency scan order identified based at least in part on using measurement results from an MDB) may be associated with low latency and/or low power, computing, and network resource consumption, and/or the RLF recovery procedure may result in the UE recovering to frequency bands that have a large bandwidth, resulting in low latency, high throughput, and/or overall more efficient usage of network resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term “sub-6 GHz” or the like, if used herein, may broadly represent frequencies that may be less than 6 GHZ, may be within FR1, or may include mid-band frequencies. Further, unless specifically stated otherwise, it should be understood that the term “millimeter wave” or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify a frequency scan order associated with an RLF recovery procedure, wherein identifying the frequency scan order includes identifying a position, in the frequency scan order, of a frequency associated with a last-acquired cell by using a measurement result of the frequency associated with the last-acquired cell that is stored in a measurement database; and perform the RLF recovery procedure by scanning one or more frequencies in the frequency scan order. Additionally, or alternatively, the communication manager 140 may perform one or more other operations described herein.

As indicated above, FIG. 1 is provided as an example. Other examples may differ from what is described with regard to FIG. 1.

Figure 2:
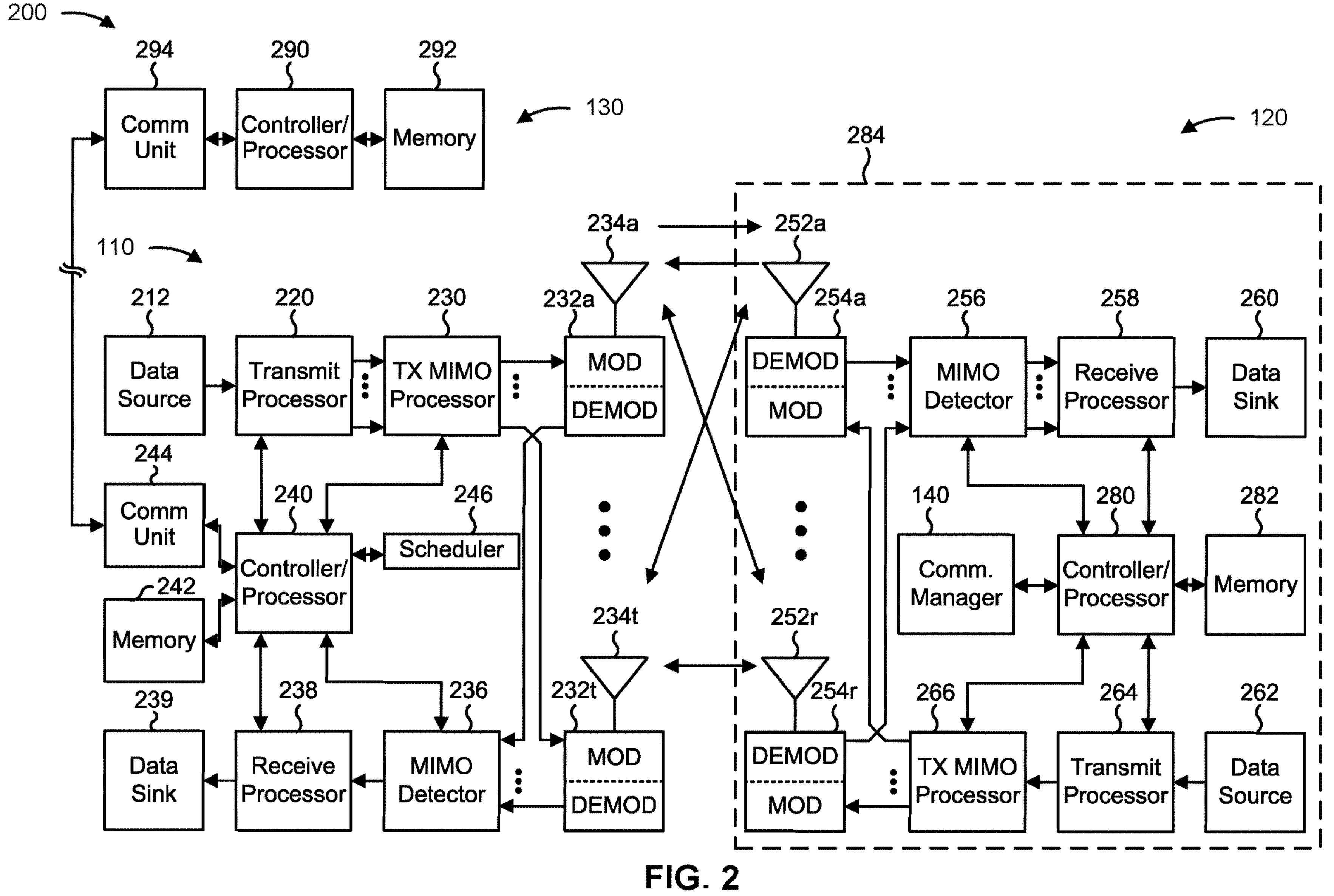
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term “controller/processor” may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-7).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-7).

The controller/processor 240 of the network node 110, the controller/processor 280 of the UE 120, and/or any other component(s) of FIG. 2 may perform one or more techniques associated with using stored measurement results for radio link failure recovery, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for identifying a frequency scan order associated with an RLF recovery procedure, wherein identifying the frequency scan order includes identifying a position, in the frequency scan order, of a frequency associated with a last-acquired cell by using a measurement result of the frequency associated with the last-acquired cell that is stored in a measurement database; and/or means for performing the RLF recovery procedure by scanning one or more frequencies in the frequency scan order. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
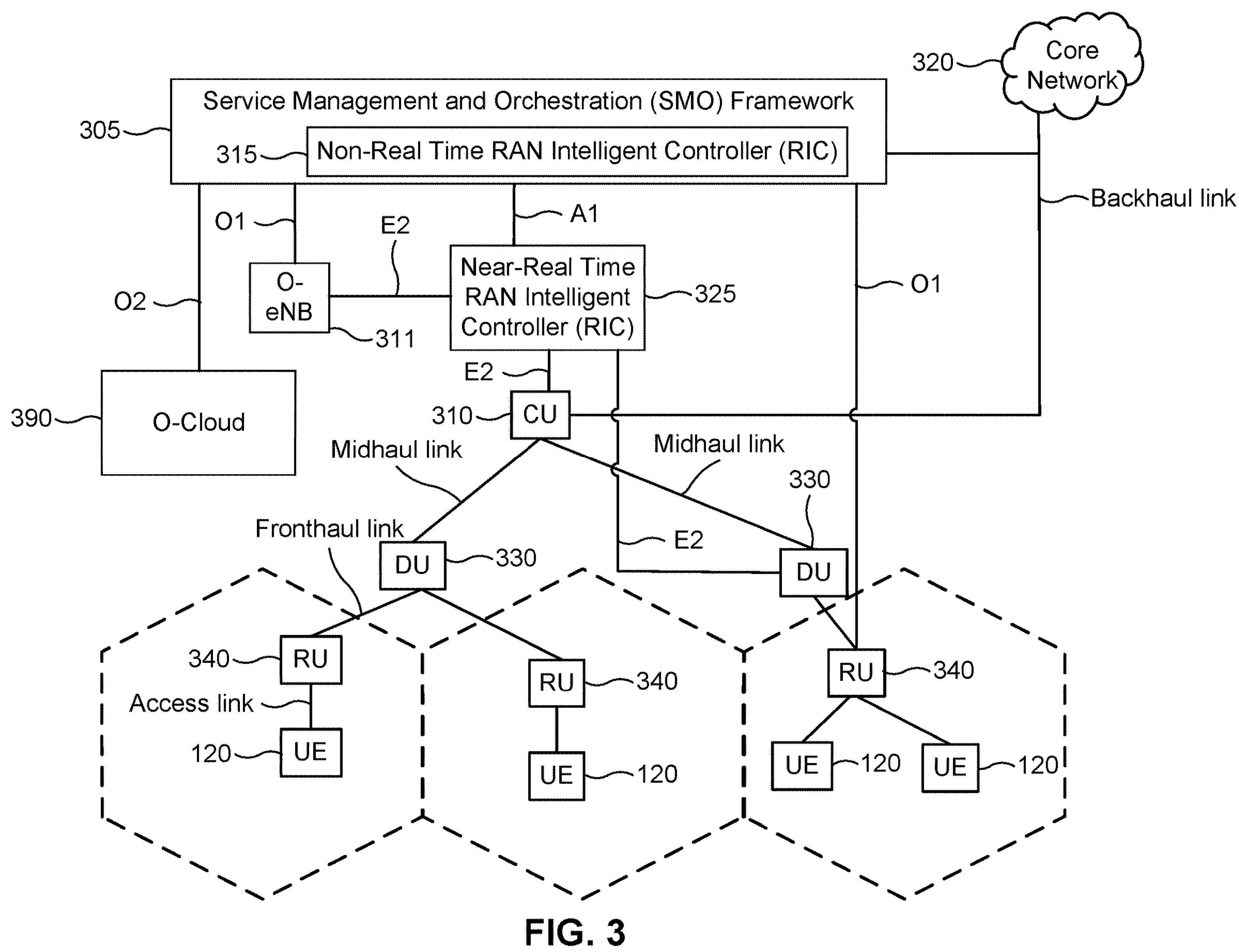
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers May be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
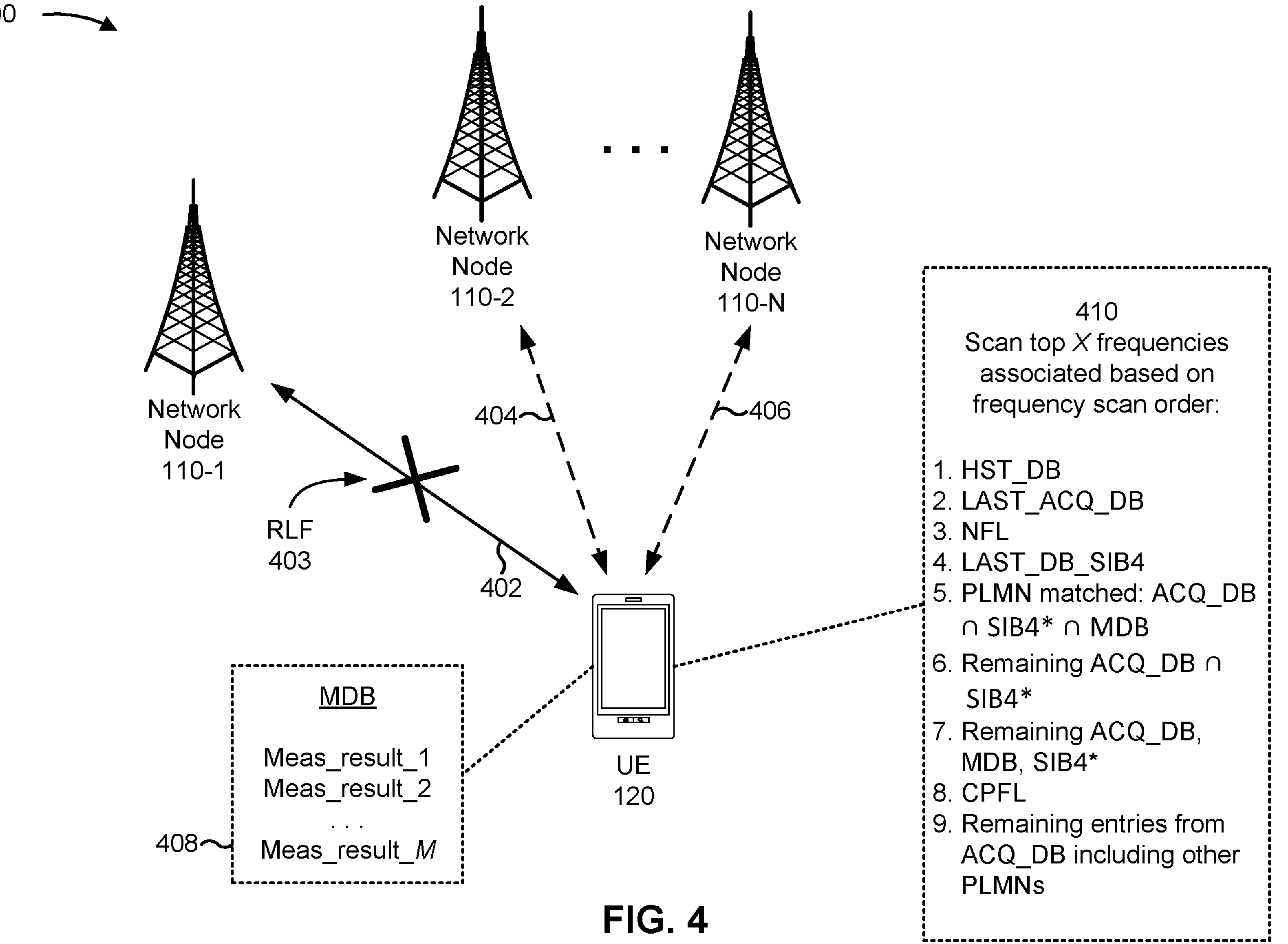
FIG. 4 is a diagram illustrating an example associated with a radio link failure (RLF) recovery procedure, in accordance with the present disclosure.

FIG. 4 is a diagram illustrating an example 400 associated with an RLF recovery procedure, in accordance with the present disclosure.

In some examples, a UE 120 connected to a network node 110 via a network (e.g., via the wireless network 100) may experience RLF. RLF refers to a situation in which a radio link between a UE 120 and a network node 110 is lost. RLF may happen due to various reasons, such as link outage, configuration failures, mobility failure recovery (e.g., handover and/or redirect failure recovery), interference, coverage issues, handover failure, or equipment malfunction, among other examples. For example, as shown in FIG. 4, and as indicated by reference number 402, a UE 120 may be in communication with a first network node 110-1, such as via an access link. As indicated by reference number 403, in some examples the radio link (e.g., the access link) between the UE 120 and the first network node 110-1 may be lost, resulting in RLF. RLF may result in a poor user experience if the UE 120 does not quickly recover to a suitable cell, and/or may result in high power, computing, and network resource consumption for performing RLF recovery procedures in order to reestablish a connection with a network node 110.

In some examples, in order to monitor neighboring cells as candidates for a handover procedure to avoid RLF, a UE 120 may be configured with a set of RLM-RS resources, such as for a purpose of measuring neighboring cells and/or a serving cell, sometimes referred to herein as measurement objects (MOs). For example, a set of RLM-RS resources may be associated with one or more SSBs and/or channel state information reference signals (CSI-RSs), among other examples. In such examples, a UE 120 may perform measurements (e.g., RSRP measurements, RSRQ measurements, or signal to noise ratio (SNR) measurements, among other examples) on the neighboring cells (e.g., the MOs) using the RLM-RS resources. In the example depicted in FIG. 4, the UE 120 may be configured with a number of MOs corresponding to a number of network nodes 110 (shown in FIG. 4 as a the first network node 110-1 through an N-th network node 110-N), and thus the UE 120 may measure signals (e.g., RLM-RSs) associated with the first network node 110-1 (e.g., via the radio link indicated by reference number 402), the second network node 110-2 (as indicated by reference number 404), the N-th network node 110-N (as indicated by reference number 406), and/or any other configured MOs. In some examples, the UE 120 may periodically transmit measurement results to the first network 110-1, such as for a purpose of the network determining if a suitable candidate cell exists for the UE 120 to perform a handover procedure. Additionally, or alternatively, the UE 120 may store measurement results associated with measurements performed on the serving cell and/or the MOs (shown in FIG. 4 as a first measurement result (meas_result_1) through an M-th measurement result (meas_result_M)), such as within an MDB associated with the UE 120, as indicated by reference number 408. Put another way, the UE 120 may store RSRP measurement results, RSRQ measurement results, SNR measurement results, and/or similar measurement results associated with a serving cell and/or one or more MOs in the MDB.

In some examples, after experiencing RLF, the UE 120 may perform an RLF recovery procedure, such as for a purpose of reconnecting to the previous serving cell or a neighboring cell. For example, based at least in part on experiencing RLF, the UE 120 may perform an acquisition scan (e.g., the UE 120 may acquire time and/or synchronization with a cell using an SSB) for multiple frequencies (sometimes referred to herein as a list frequency scan (LFS)) in order to locate a suitable frequency (e.g., cell) for establishing a radio link, thereby recovering from RLF. For example, as indicated by reference number 410, as part of an RLF recovery procedure, the UE 120 may scan a top X frequencies associated with a frequency scan order. Put another way, the UE 120 may perform an acquisition scan on the top X frequencies (e.g., the top 5 frequencies) in the frequency scan order (e.g., the LFS order), may sort results from the top X frequencies in the frequency scan order, and/or may camp on strongest candidates from the top X frequencies in the frequency scan order.

As shown by reference number 410, in some examples the frequency scan order (e.g., the LFS order) may include one or more frequencies associated with a database and/or a frequency list stored at the UE 120, such as an HST database (sometimes referred to as HST_DB), a last acquired cell database (sometimes referred to as LAST_ACQ_DB), a non-access stratum (NAS) frequency list (NFL), a last acquired SIB4 database (sometimes referred to as LAST_DB_SIB4), an acquired cell database (sometimes referred to as ACQ_DB), a SIB4* database (sometimes referred to simply as SIB4*), or a control plane frequency list (CPFL), among other examples.

The HST_DB may be a database that stores one or more frequencies associated with a HST. LAST_ACQ_DB may be a database that stores a frequency associated with a last-acquired cell, which may be a frequency associated with a serving cell (e.g., a cell associated with the first network node 110-1 in the example shown in FIG. 4) when the UE 120 experienced RLF. NFL may be a list of frequencies provided by a NAS entity of the core network to the UE 120. LAST_DB_SIB4 may be a database including frequencies that were last indicated by a SIB4 communication (e.g., a communication from the first network node 110-1 to the UE 120 that contains parameters and/or frequencies associated inter-frequency cell reselection) transmitted to the UE 120. ACQ_DB may be a database that indicates frequencies that the UE 120 previously acquired (e.g., camped on). In some examples, the LAST_ACQ_DB may refer to the first entry in the ACQ_DB. SIB4* may be a database that includes multiple other databases, such as a SIB4_DB, which is a database including frequencies associated with previously received SIB4 communications (sometimes referred to as SIB4 neighbors), an inter-RAT (IRAT) database (sometimes referred to as IRAT_DB), which is a database where IRAT (e.g., idle) neighbors are present, and a secondary cell (SCell) database (sometimes referred to as SCell_DB), which is a database where connected mode MOs are present. CPFL may be a list of frequencies indicated to the UE 120 by a control plane network entity (e.g., a CU associated with CP functionality).

In that regard, during the RLF recovery procedure, the UE 120 may be configured to determine the top X frequencies according to the sequence shown in the frequency scan order indicated by reference number 410, and perform an acquisition scan on the top X frequencies in an effort to find a suitable candidate for reconnection. For example, because the HST_DB is presented first in the frequency scan order, if any frequencies are present in the HST_DB, the UE 120 may first scan those frequencies when performing an RLF recovery procedure. Moreover, because the LAST_ACQ_DB is presented only after the HST_DB in the frequency scan order, the UE 120 may scan the frequency associated with the last-acquired cell first when no HST frequencies are present during an RLF recovery procedure, or following any HST frequencies when the HST frequencies are present. In this regard, the UE 120 may almost always perform an acquisition scan on the frequency associated with the last-acquired cell, because the frequency associated with the last-acquired cell is located high in the frequency scan order.

Additionally, following the frequency associated with the last-acquired cell, the UE 120 may perform acquisition scans on any frequencies indicated by the NFL (e.g., at step 3 in the frequency scan order indicated by reference number 410), and then on any frequencies indicated by the LAST_DB_SIB4 (e.g., at step 4 in the frequency scan order indicated by reference number 410). At step 5 in the frequency scan order indicated by reference number 410, the UE 120 may perform acquisition scans on frequencies that are associated with a public land mobile network (PLMN) corresponding to the UE 120, that are included in both the ACQ_DB and the SIB4* (e.g., included in at least one of SIB4_DB, IRAT_DB, or SCell_DB), and that include measurement results in the MDB. If multiple frequencies match this criteria, the UE 120 may sort the frequencies by RSRP value stored in the MDB (e.g., the UE 120 may prioritize frequencies associated with a highest RSRP value in step 5 in the frequency scan order indicated by reference number 410).

At step 6 in the frequency scan order indicated by reference number 410, the UE 120 may perform acquisition scans on any remaining frequencies (e.g., frequencies not already scanned as part of steps 1-5) that are included in both the ACQ_DB and the SIB4* (e.g., included in at least one of SIB4_DB, IRAT_DB, or SCell_DB). At step 7 in the frequency scan order indicated by reference number 410, the UE 120 may perform acquisition scans on any remaining frequencies (e.g., frequencies not already scanned as part of steps 1-6) that are included in one or more of the ACQ_DB, the MDB, or the SIB4*. At step 8 in the frequency scan order indicated by reference number 410, the UE 120 may perform acquisition scans on any frequencies indicated by the CPFL. And at step 9 in the frequency scan order indicated by reference number 410, the UE 120 may perform acquisition scans on any remaining frequencies (e.g., frequencies not already scanned as part of steps 1-8) included in the ACQ_DB, including frequencies associated with PLMNs not associated with the UE 120, among other examples.

In that regard, the frequency associated with the last-acquired cell (e.g., the LAST_ACQ_DB) may always be part of the top X frequencies to be scanned because LAST_ACQ_DB is near the top of the frequency scan order (e.g., only behind HST frequencies). However, often the frequency associated with the last-acquired cell may be a relatively poor candidate for an RLF recovery procedure because the frequency may have been relatively weak, leading to the RLF in the first place. Moreover, in examples in which HST frequencies are present in the HST_DB, the UE 120 may scan each HST frequency in an order that the HST frequencies are stored in the HST_DB, even if frequencies listed higher in the HST_DB are relatively poor candidates for reestablishing a radio link. As a result, the UE 120 may spend time scanning the frequency associated with the last-acquired cell and/or one or more HST frequencies and/or the UE 120 may consume power, computing, and network resources to scan the frequency associated with the last-acquired cell and/or one or more HST frequencies, irrespective of whether a particular frequency is a strong or weak RLF recovery candidate (e.g., whether the cell was associated with high or low RSRP, RSRQ, and/or SNR measurements). This may result in an RLF recovery procedure that is associated with high latency and/or high resource consumption. Moreover, when selecting a frequency and/or cell for connection as part of an RLF recovery procedure, the UE 120 may be configured to select a frequency and/or cell from the top X frequencies that is associated with a highest measurement result (e.g., a highest RSRP) acquired during the top X frequency scan. This may result in the UE 120 connecting to a cell associated with a relatively small bandwidth. Accordingly, after reconnecting to the network, communications between a network node 110 and the UE 120 may be associated with high latency, low throughput, and/or overall inefficient usage of network resources.

Some techniques and apparatuses described herein enable optimized RLF recovery procedures, such as optimized RLF recovery procedures associated with performing an acquisition scan on a top X frequencies associated with a frequency scan order. In some aspects, a UE may be configured to identify a frequency scan order associated with an RLF recovery procedure using measurement results stored in an MDB at the UE. For example, the UE may identify a position of a frequency associated with a last-acquired cell (e.g., LAST-ACQ_DB) in the frequency scan order by using a measurement result of the frequency associated with the last-acquired cell that is stored in the MDB. Additionally, or alternatively, the UE may sort HST frequencies (e.g., frequencies associated with the HST_DB) using measurement results stored in the MDB, such as by placing a first HST frequency associated with a relatively high RSRP value higher in the frequency scan order than a second HST frequency associated with a relatively low RSRP value. In some aspects, the UE may be configured to sort certain frequencies in the frequency scan order according to bandwidth size, such that frequencies associated with larger bandwidths are scanned prior to scanning bandwidths associated with smaller bandwidths. Moreover, in some aspects the UE may be configured to maintain previously acquired measurement results in the MDB even if the UE receives a new measurement configuration, such that the measurement results may be used for identifying an optimal frequency scan order. As a result, an RLF recovery procedure with the optimized frequency scan order (e.g., a frequency scan order identified based at least in part on using measurement results from an MDB) may be associated with low latency and/or low power, computing, and network resource consumption, and/or the RLF recovery procedure may result in the UE recovering to frequency bands that have a large bandwidth, resulting in low latency, high throughput, and/or overall more efficient usage of network resources.

As indicated above, FIG. 4 is provided as an example. Other examples may differ from what is described with respect to FIG. 4.

FIGS. 5A-5G are diagrams illustrating an example 500 associated with using stored measurement results for RLF recovery, in accordance with the present disclosure. Example 500 includes communication between a UE 120 and one or more network nodes 110 (e.g., a first network node 110-1 through an N-th network node 110-N). In some aspects, the UEs 120 and the network nodes 110 may be included in a wireless network, such as wireless network 100. The UE 120 and the network nodes 110 may communicate via a wireless access link, which may include an uplink and a downlink.

In some aspects, because an MDB may include measurement results for a frequency associated with a last-acquired cell (e.g., a cell that the UE 120 was camped on when the UE 120 experienced RLF), the UE 120 may use one or more measurement results to determine whether the last-acquired cell is a good candidate for reconnection. For example, the UE 120 may identify a frequency scan order associated with an RLF recovery procedure by identifying a position, in the frequency scan order, of a frequency associated with the last-acquired cell by using a measurement result of the frequency associated with the last-acquired cell that is stored in the MDB. For example, in some aspects, the UE 120 may identify whether a measurement result associated with the last-acquired cell satisfies a threshold. If so, the UE 120 may attempt to perform an RLF recovery procedure to the last-acquired cell. However, if the last-acquired cell is not a good candidate for reconnection (e.g., if the measurement results do not satisfy the threshold), the UE 120 may move the last-acquired cell down in a frequency scan order, such as for a purpose of forgoing time and resource consumption associated with scanning a frequency which ultimately will not be a good candidate for establishing a network connection.

Figure 5A:
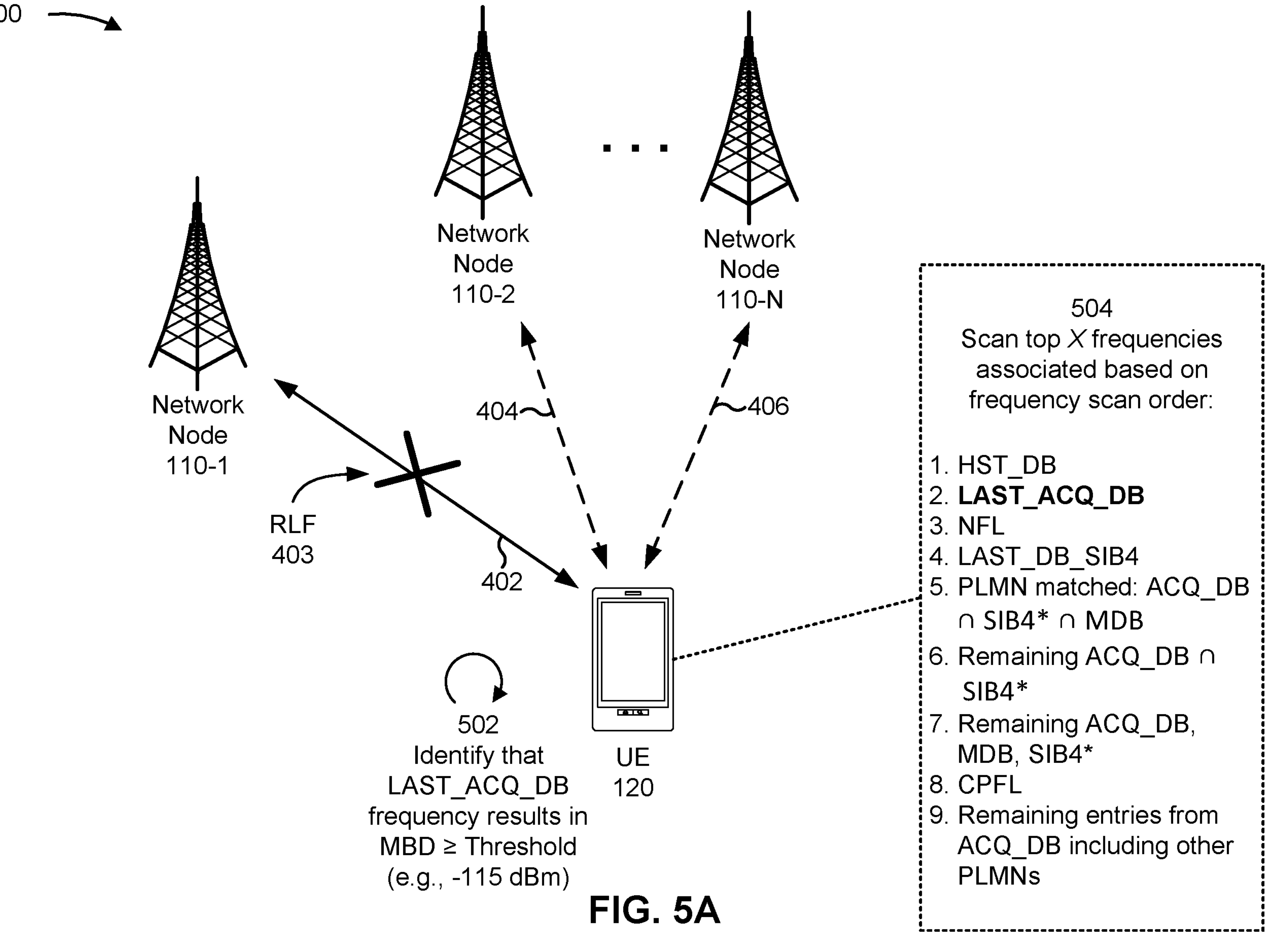

More particularly, as shown in FIG. 5A, and as indicated by reference number 502, in some aspects the UE 120 may identify that a measurement result of the frequency associated with the last-acquired cell (e.g., a measurement result of a frequency that is listed first in an ACQ_DB and/or that is associated with the LAST_ACQ_DB) satisfies a threshold. For example, in the aspect shown in FIG. 5A, the UE 120 may identify whether a measurement result (e.g., an RSRP measurement, an RSRQ measurement, an SNR measurement, and/or a similar measurement) is greater than or equal to −115 decibel-milliwatts (dBm). If the measurement result of the frequency associated with the last-acquired cell satisfies the measurement threshold (e.g., −115 dBm), the UE 120 may place the frequency associated with the last-acquired cell at a first position in the frequency scan order, such as at step 2 as shown in the frequency scan order shown by reference number 504. The UE 120 may then perform the RLF recovery procedure by scanning one or more frequencies in the frequency scan order (e.g., a top X frequencies in the frequency scan order), in a similar manner as described above in connection with FIG. 4. Because, in this aspect, the UE 120 first identified that the frequency associated with the last-acquired cell satisfied the threshold (e.g., −115 dBm), the frequency associated with the last-acquired cell may be considered a good candidate for reestablishing a connection with the network, and thus the frequency associated with the last-acquired cell may be placed relatively high in the frequency scan order (e.g., just below HST frequencies), thereby ensuring that the UE 120 scans the frequency associated with the last-acquired cell relatively early in an RLF recovery procedure.

Figure 5B:
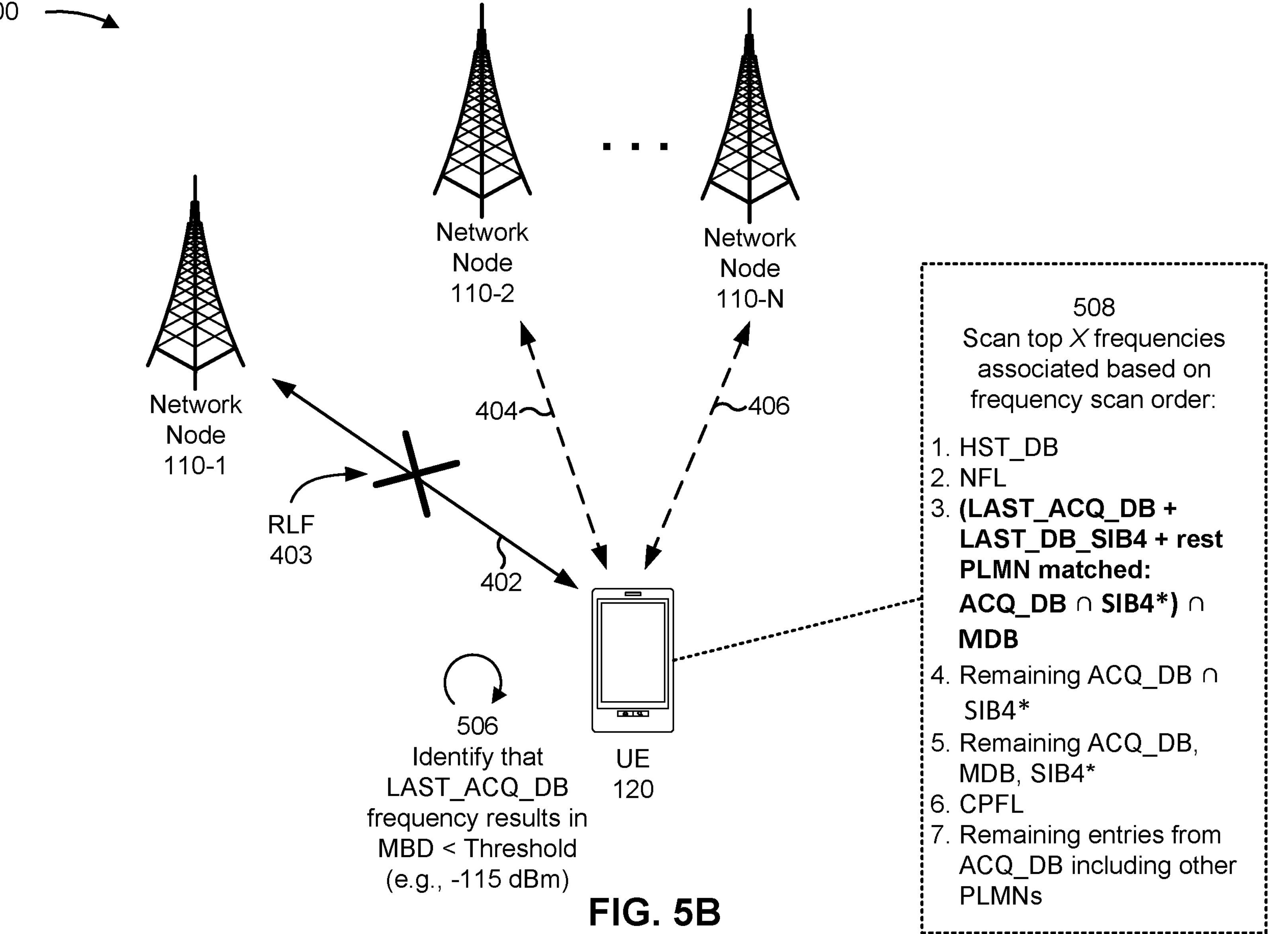

As shown in FIG. 5B, and as indicated by reference number 506, in some aspects the UE 120 may identify that the measurement result of the frequency associated with the last-acquired cell does not satisfy the measurement threshold (e.g., −115 dBm). In such aspects, and as indicated by the frequency scan order shown in connection with reference number 508, the UE 120 may place the frequency associated with the last-acquired cell at a second position in the frequency scan order that is lower than the first position (e.g., the position where the frequency associated with the last-acquired cell is placed when the measurement result satisfies the threshold). More particularly, as described above in connection with FIG. 5A, in aspects in which the measurement result for the frequency associated with the last-acquired cell satisfies the threshold (e.g., −115 dBm), the frequency associated with the last-acquired cell may be placed at step 2 in the frequency scan order (and thus is second only to HST frequencies, if any), and in aspects in which the measurement result for the frequency associated with the last-acquired cell does not satisfy the threshold, the frequency associated with the last-acquired cell may be placed at step 3 in the frequency scan order.

Additionally, or alternatively, as shown in the frequency scan order indicated by reference number 508, when the frequency associated with the last-acquired cell does not satisfy the threshold and/or is placed at step 3 in the frequency scan order, the frequency associated with the last-acquired cell may be sorted by the UE 120, such that one or more other frequencies may be scanned prior to the frequency associated with the last-acquired cell (e.g., due to measurement results associated with one or more other frequencies being relatively high and/or due to the one or more other frequencies being better candidates for establishing a connection with the network than the frequency associated with the last-acquired cell). For example, in the aspects shown in FIG. 5B, the UE 120 may, when identifying the frequency scan order, sort frequencies that are associated with both the MDB (e.g., frequencies that include measurement results in the MDB) and at least one of the frequency associated with the last-acquired cell (e.g., LAST_ACQ_DB), a frequency associated with a last-acquired neighbor cell (e.g., LAST_DB_SIB4), or one or more frequencies included in both a previously-acquired-cell database (e.g., ACQ_DB) and a system-information-block-4-star database (e.g., SIB4*) (such as a PLMN matched frequencies included in both ACQ_DB and SIB4*). Put another way, at step 3 of the frequency scan order shown in connection with reference number 508, the UE 120 may sort frequencies associated with the expression (LAST_ACQ_DB+LAST_DB_SIB4+ rest PLMN matched: ACQ_DB∩SIB4*)∩MDB.

Figure 5C:
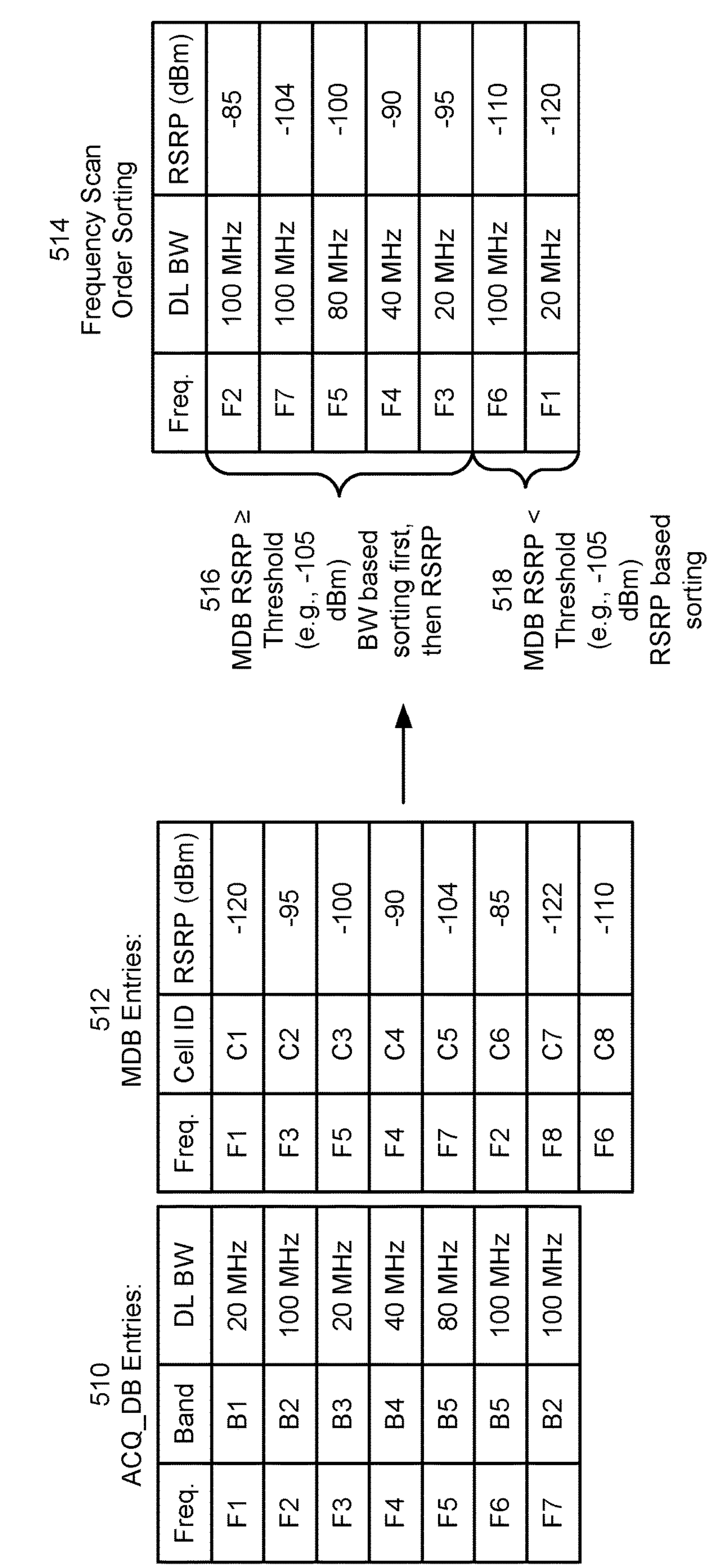

As shown in FIG. 5C, in some aspects sorting the frequencies that are associated with both the MDB and the at least one of the frequency associated with the last-acquired cell, the frequency associated with the last-acquired neighbor cell, or the one or more frequencies included in both the previously-acquired-cell database and the system-information-block-4-star database (e.g., the frequencies that satisfy the expression (LAST_ACQ_DB+LAST_DB_SIB4+ rest PLMN matched: ACQ_DB∩SIB4*)∩MDB) may include identifying a first sorted subset by sorting a first subset of frequencies by bandwidth size based at least in part on measurement results associated with the first subset satisfying an RSRP threshold, identifying a second sorted subset by sorting a second subset of frequencies by measurement results based at least in part on measurement results associated with the second subset failing to satisfy the RSRP threshold, and placing the first sorted subset higher in the frequency scan order than the second sorted subset.

For example, as indicated by reference number 510, the ACQ_DB may include seven frequencies, shown as F1-F7, with each frequency being associated with a particular band (e.g., one of B1-B5) and a downlink bandwidth size (shown as "DL BW"). Moreover, as shown by reference number 512, the MDB may include at least some of the frequencies from the ACQ_DB (e.g., in the example shown in FIG. 5C, the MDB includes all of F1-F7, in addition to F8, but in some other aspects the MDB may not include all the frequencies included in the ACQ_DB), each associated with a corresponding cell identifier (ID) (e.g., one of C1-C8) and a measurement result (e.g., an RSRP value).

As shown by reference number 514, the frequencies may be sorted by the UE 120 (e.g., as part of step 3 of the frequency scan order shown in connection with reference number 508 in FIG. 5B) by sorting a first subset of frequencies by bandwidth size and by sorting a second subset of frequencies by RSRP. More particularly, as indicated by reference number 516, because an RSRP of a first subset of frequencies (e.g., F2, F3, F4, F5, and F7) satisfy an RSRP threshold (e.g., −105 dBm), the UE 120 may place those frequencies higher in the frequency scan order and/or may sort those frequencies by bandwidth size (e.g., sorted such that frequencies associated with larger bandwidths are prioritized in the frequency scan order). This may enable prioritization of frequencies associated with high network capacity (e.g., a large downlink bandwidth) among frequencies that are associated with relatively strong measurement results (e.g., RSRPs above −115 dBm in the example shown in FIG. 5C). Moreover, as indicated by reference number 518, because an RSRP of a second subset of frequencies (e.g., F1 and F6) do not satisfy an RSRP threshold (e.g., −105 dBm), the UE 120 may place those frequencies lower in the frequency scan order and/or may sort those frequencies by RSRP (e.g., sorted such that frequencies associated with higher RSRPs are prioritized in the frequency scan order). In this example, because the frequency associated with the last-acquired cell (e.g., F1) was associated with a relatively low RSRP (e.g., −120 dBm), indicative that F1 is a poor candidate for reestablishing a connection with the network, the operations described above result in the frequency associated with the last-acquired cell being placed low in the sorted list shown in connection with reference number 514.

In some other aspects, the UE 120 may sort or prioritize certain frequencies in the frequency scan order using additional or different criteria, such as by prioritizing time domain division (TDD) frequencies over frequency domain division (FDD) frequencies, among other examples. For example, returning to the example shown in FIG. 5B, at step 4 in the frequency scan order indicated by reference number 508, the UE 120 may scan frequencies that are associated with both the previously-acquired-cell database (e.g., ACQ_DB) and the system-information-block-4-star database (e.g., SIB4*). Put another way, step 4 of the frequency scan order in this example may include scanning frequencies that satisfy the expression ACQ_DB n SIB4* and that have not otherwise already been scanned in a previous step. In such aspects, the UE 120 may sort the frequencies that are associated with both the previously-acquired-cell database and the system-information-block-4-star database (e.g., the remaining ACQ_DB N SIB4* frequencies) by bandwidth size (e.g., which may be stored in the downlink bandwidth field of the ACQ_DB).

Additionally, or alternatively, at step 5 in the frequency scan order indicated by reference number 508, the UE 120 may scan any remaining frequencies (e.g., frequencies that have not already been scanned per a previous step in the frequency scan order) that are associated with the previously-acquired-cell database (e.g., ACQ_DB), the MDB, and/or the system-information-block-4-star database (e.g., SIB4*). In such aspects, the UE 120 may sort any remaining frequencies associated with the previously-acquired-cell database (e.g., ACQ_DB) by bandwidth size. Additionally, or alternatively, with respect to any remaining frequencies associated with the MDB, for a first subset of frequencies having measurement results in the MDB that satisfy an RSRP threshold (e.g., −105 dBm), the UE 120 may place TDD frequencies higher in the frequency scan order than FDD frequencies, and, for a second subset of frequencies having measurement results in the measurement database that do not satisfy the RSRP threshold (e.g., −105 dBm), the UE 120 may sort the second subset of frequencies by measurement results (e.g., by prioritizing frequencies associated with highest RSRP values). In such aspects, the first subset of frequencies (e.g., the subset of frequencies satisfying the RSRP threshold) may be placed higher in the frequency scan order than the second set of frequencies (e.g., the subset of frequencies that do not satisfy the RSRP threshold). Additionally, or alternatively, the UE 120 may sort any remaining frequencies associated with the system-information-block-4-star database (e.g., SIB4*) by prioritizing TDD frequencies over FDD frequencies (e.g., the UE 120 may place TDD frequencies higher in the frequency scan order than FDD frequencies).

Figure 5D:
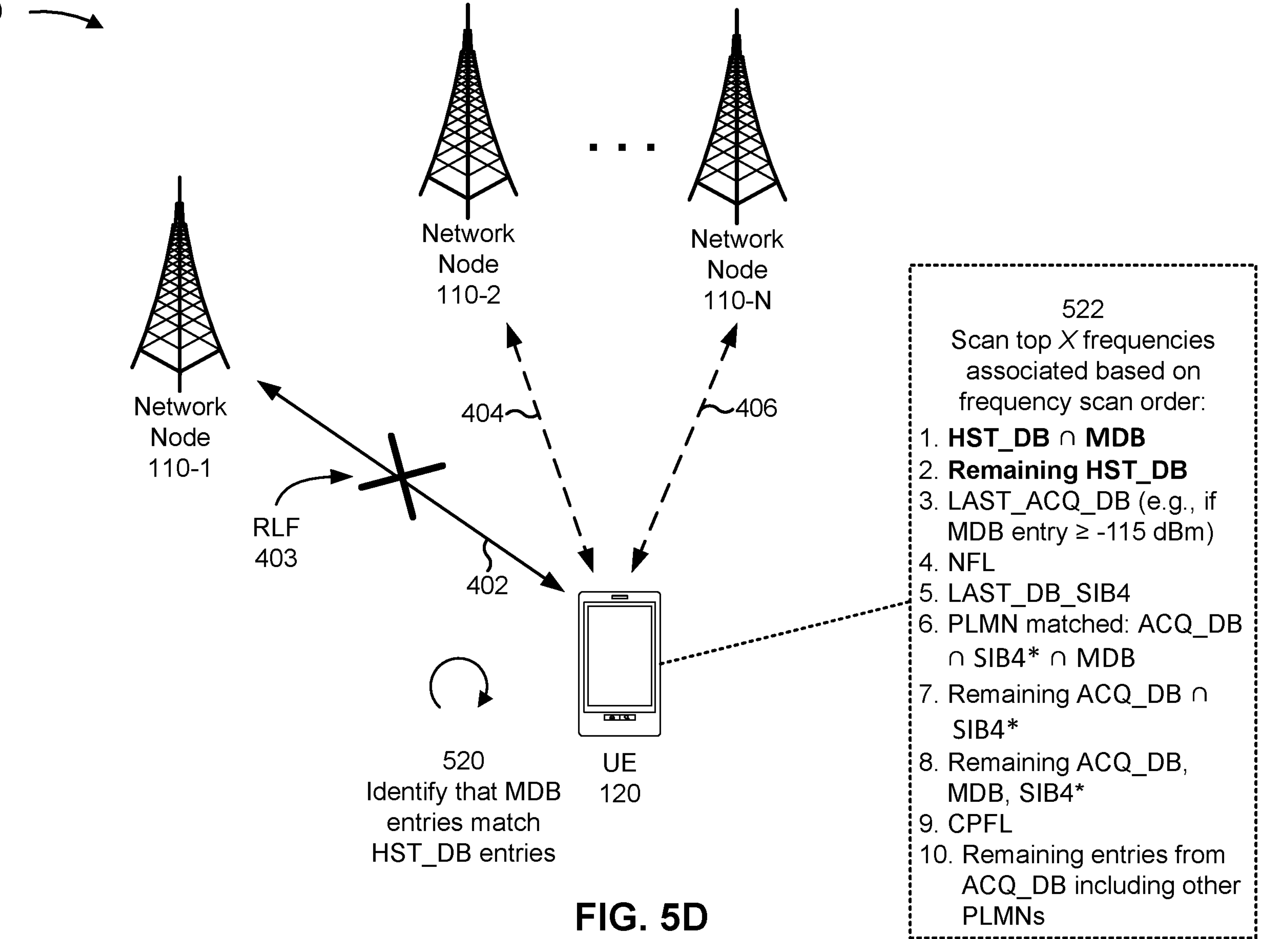

As shown in FIG. 5D, in aspects in which an HST database (e.g., HST_DB) includes one or more entries, the UE 120 may sort one or more frequencies using measurement results stored in the MDB, such as for a purpose of scanning strongest cells first when attempting to reconnect to the network via an HST frequency. More particularly, as indicated by reference number 520, in some aspects, the UE 120 may identify that the HST database includes entries and/or the UE 120 may identify that one or more frequencies listed in the MDB match one or more frequencies listed in the HST database. In such aspects, the UE 120 may sort the HST frequencies using the stored measurement results. More particularly, as indicated at step 1 in the frequency scan order indicated by reference number 522, in some aspects, the UE 120 may sort a subset of frequencies included in a HST database that have measurement results in the measurement database (e.g., frequencies that satisfy the expression HST_DB∩MDB) by measurement results. As indicated by step 2 in the frequency scan order indicated by reference number 522, the UE 120 may then scan any remaining HST frequencies, such as any frequencies that are listed in the HST database but are not included in the MDB.

Figure 5E:
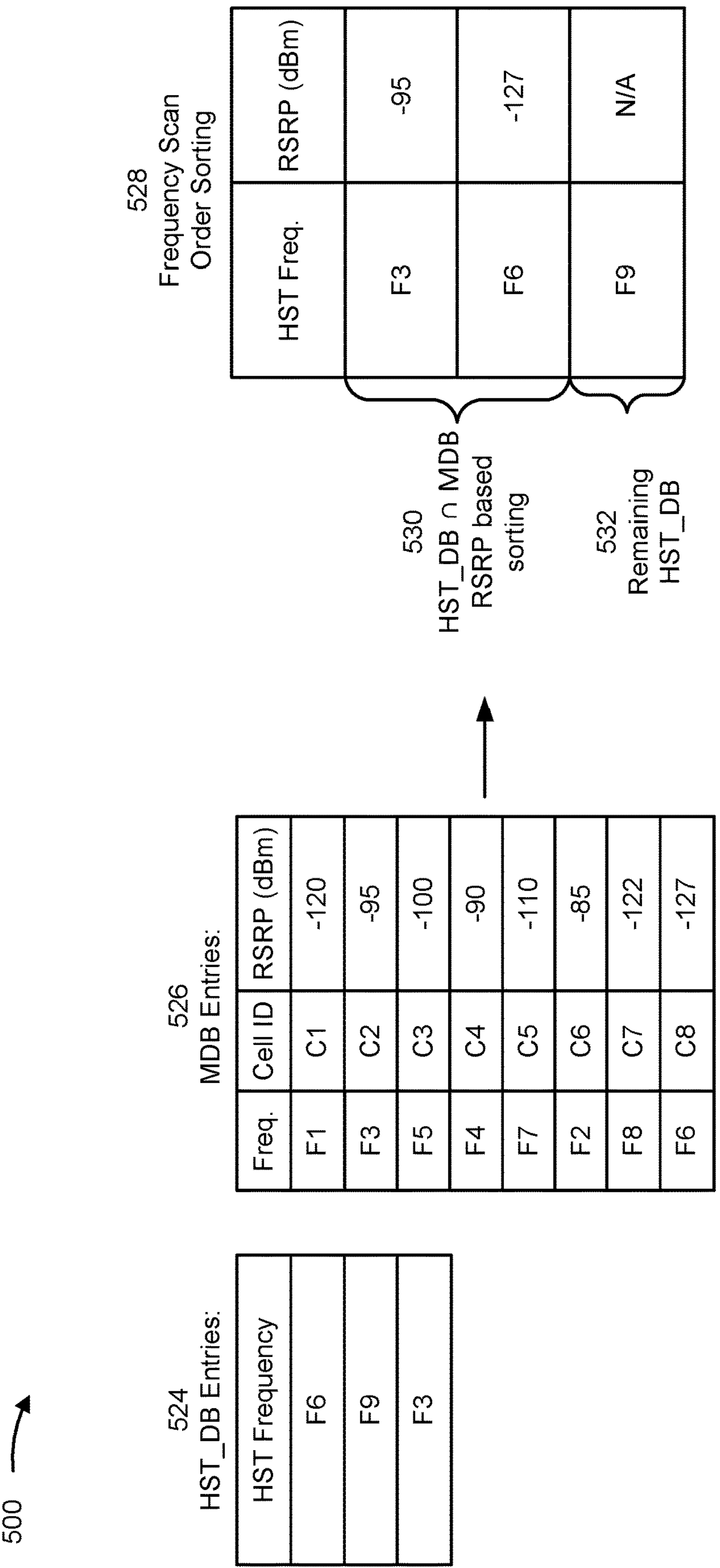

More particularly, as shown in FIG. 5E, and as indicated by reference number 524, HST_DB may include three frequencies, shown as F6, F9, and F3. If the measurement results were not utilized to sort these frequencies, the UE 120 may simply scan the frequencies in the order listed in the HST_DB (e.g., the UE 120 may scan F6 first, followed by F9, and then F3). This may be inefficient if the frequencies listed highest in the HST_DB are poor candidates for reestablishing a network connection. Accordingly, the measurement results in the MDB may be utilized in order to scan relatively strong HST frequencies first during an RLF recovery procedure.

For example, as indicated by reference number 526, the MDB in this example includes eight frequencies, including F3 and F6 (which are also included in the HST_DB). Accordingly, as indicated by reference number 528, the UE 120 may sort the HST frequencies that are included in the MDB by measurement result (e.g., by RSRP value), and then may sort any remaining HST frequencies that are not included in the MDB accordingly to the order listed in the HST_DB. Accordingly, as indicated by reference number 530, the UE 120 may place F3 and F6 highest in the frequency scan order, because both are associated with measurement results in the MDB, and/or the UE 120 may place F3 higher than F6 in the frequency scan order, because F3 is associated with a higher RSRP than F6 (e.g., −95 dBm as compared to −127 dBm), ensuring that the strongest known HST frequency is searched first. Moreover, as indicated by 532, the UE 120 may place any HST frequencies that do not have known measurement results (e.g., F9 in this example) below any HST frequencies that have known measurement results, thereby prioritizing previously measured HST frequencies over non-measured HST frequencies.

In some aspects, in order to maintain a robust MDB, such as for a purpose of performing an MDB-based frequency scan list sorting as described above in connection with the examples shown in FIGS. 5A-5E, the UE 120 may be configured to retain certain measurement results, notwithstanding a serving cell change or a changed measurement configuration, among other examples. For example, in some aspects, the UE 120 may be configured to retain the MDB entries after receiving a new measurement configuration and/or may be configured to only add frequencies to an MDB which are different from existing MDB entries when receiving a new measurement configuration. Additionally, or alternatively, the UE 120 may be configured to retain MDB entries for common neighboring cells, even after a change in serving cell, among other examples.

Figure 5F:
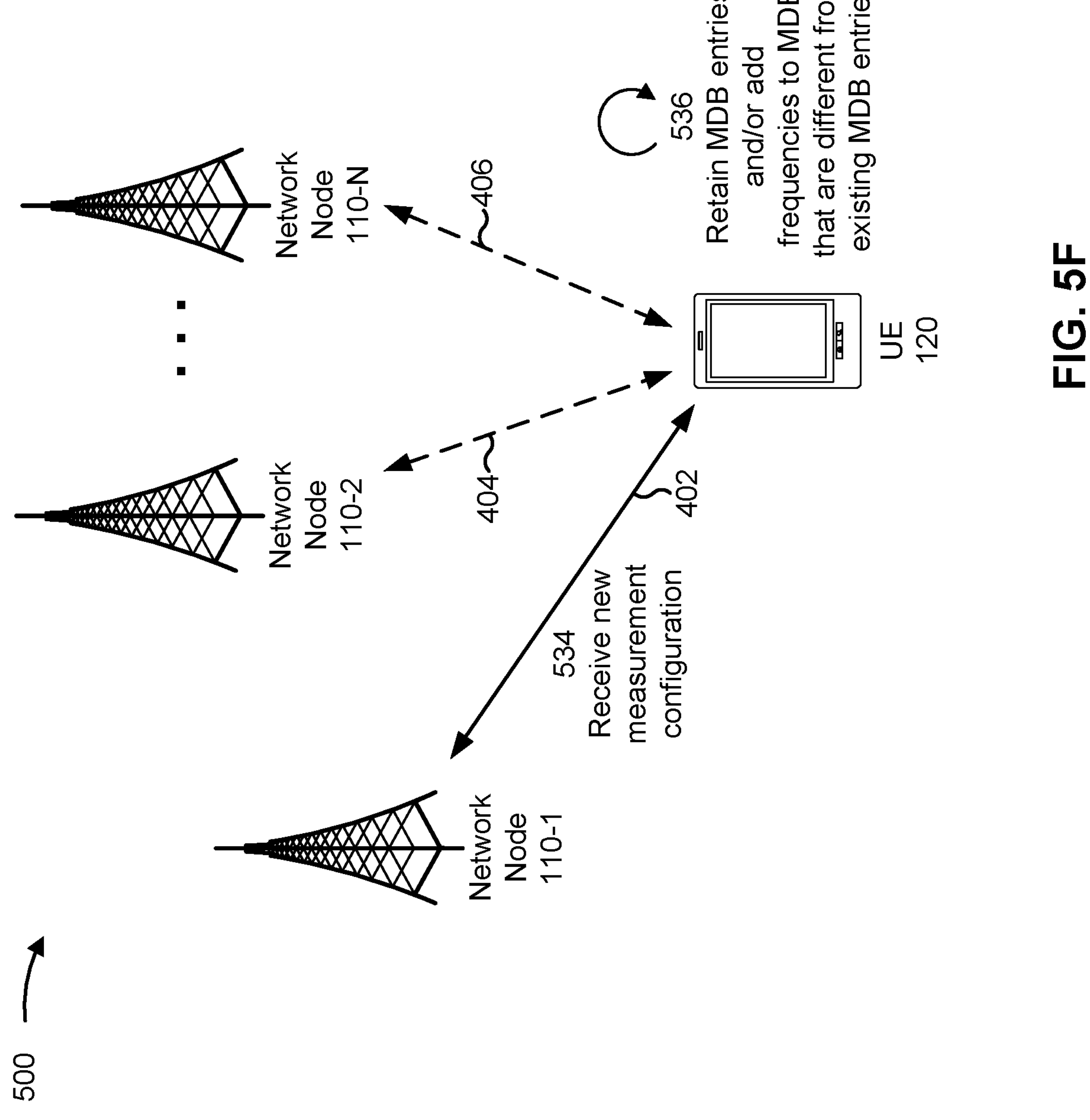

More particularly, as shown in FIG. 5F, and as indicated by reference number 534, in some aspects the UE 120 may receive (e.g., from a serving cell, such as the first network node 110-1) a new measurement configuration that configures measurement, by the UE 120, of frequencies associated with one or more neighboring cells. As indicated by reference number 536, based at least in part on receiving the new measurement configuration, the UE 120 may measure frequencies indicated by the new measurement configuration and/or may store one or more measurement results associated with the new frequencies in the measurement database. Moreover, the UE 120 may retain one or more previously acquired measurement results in the measurement database, such as measurement results associated with one or more frequencies not configured for measurement by the new measurement configuration. In this way, if the UE 120 experiences RLF and/or performs an RLF recovery procedure, the MDB may include numerous frequencies and/or measurement results in order to enable robust frequency scan order sorting.

Similarly, the UE 120 may be configured to retain MDB entries for common neighboring cells even after a change in a serving cell, or the like. For example, in some aspects, the UE 120 may receive a first measurement configuration that configures measurement of a first group of one or more neighboring cells, and the UE 120 may thereafter receive a second measurement configuration that configures measurement of a second group of one or more neighboring cells. In such aspects, if the UE 120 identifies common neighboring cells among the two configurations (e.g., if the UE 120 identifies that a first neighboring cell, of the first group of one or more neighboring cells, is a same cell as a second neighboring cell, of the second group of one or more neighboring cells), the UE may retain a previously acquired measurement result for the common neighboring cells and/or may refrain from adding the common neighboring cells to the MDB (e.g., because they common neighboring cells are already present in the MDB).

More particularly, FIG. 5G shows one example of a UE 120 retaining MDB entries, notwithstanding a change in measurement configuration. As indicated by reference number 538, a frequency of a serving cell of the UE 120 may be F1, a SIB4_DB (e.g., a database associated with neighbors to measure while in an idle mode) may include F3, F5, F4, F7, and F9, and an SCell_DB (e.g., a database associated with neighbors to measure while in a connected mode) may include F7, F6, and F10. In such aspects, and as indicated by reference number 540, when in the idle mode, the MDB may include entries for the serving cell (e.g., F1) as well as available SIB4 neighbors (e.g., F3, F5, F4, and F7). As shown using cross-hatching, F9, which is configured for measurement, may not be present (e.g., the UE 120 may not detect a reference signal from F9), and thus the MDB may omit an entry for F9.

As indicated by reference number 542, the UE 120 may thereafter transition to a connected mode and thus may receive three MOs (e.g., the frequencies associated with the SCell_DB), which, in this example, include F7, F6, and F10. As indicated by reference number 544, notwithstanding the new measurement configuration, the UE 120 may retain the previously MDB entries, including the available SIB4 entries captured in the MDB (e.g., F3, F5, F4, and F7). Moreover, the UE 120 may only add frequencies to the MDB that are different from existing MDB entries. For example, in this aspect, F7 (shown in bold type), which is one of the MOs configured for the UE 120 when the UE 120 transitioned to the connected mode, is already in the MDB, because it was an available SIB4 neighbor that was captured in the MDB. Accordingly, the UE 120 may not add F7 to the MDB. Instead, the UE 120 may only add F10 and/or F6 to the MDB, and/or may retain the existing MDB entry for F7. As shown in the MDB indicated by reference number 544, the UE 120 may thus add F10, but may omit F6 because, as indicated using cross-hatching, F6 may not be present (e.g., the UE 120 may not detect a reference signal from F6).

Based at least in part on using MDB entries to determine a frequency scan order associated with an RLF recovery procedure, the UE 120 and/or the network node 110 may conserve computing, power, network, and/or communication resources that may have otherwise been consumed traditional RLF recovery procedures. For example, based at least in part on using MDB entries to determine a frequency scan order associated with an RLF recovery procedure, the UE 120 may implement an RLF recovery procedure associated with low latency and/or low power, computing, and network resource consumption, and/or may implement an RLF recovery procedure that results in the UE recovering to frequency bands that have a large bandwidth, resulting in low latency, high throughput, and/or overall more efficient usage of network resources.

As indicated above, FIGS. 5A-5G are provided as an example. Other examples may differ from what is described with respect to FIGS. 5A-5G.

Figure 6:
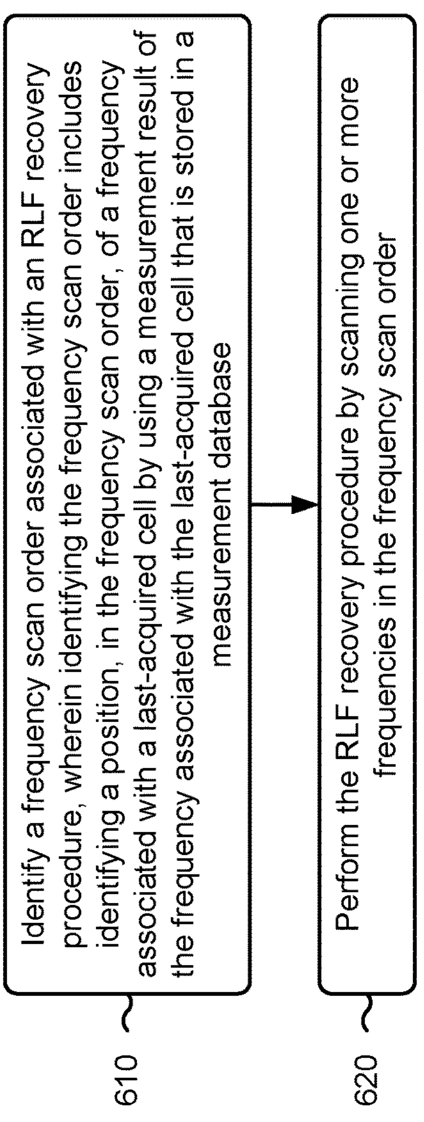
FIG. 6 is a diagram illustrating an example process performed, for example, at a UE or an apparatus of a UE, in accordance with the present disclosure.

FIG. 6 is a diagram illustrating an example process 600 performed, for example, at a UE or an apparatus of a UE, in accordance with the present disclosure. Example process 600 is an example where the apparatus or the UE (e.g., UE 120) performs operations associated with using stored measurement results for RLF recovery.

As shown in FIG. 6, in some aspects, process 600 may include identifying a frequency scan order associated with an RLF recovery procedure, wherein identifying the frequency scan order includes identifying a position, in the frequency scan order, of a frequency associated with a last-acquired cell by using a measurement result of the frequency associated with the last-acquired cell that is stored in a measurement database (block 610). For example, the UE (e.g., using communication manager 706, depicted in FIG. 7) may identify a frequency scan order associated with an RLF recovery procedure, wherein identifying the frequency scan order includes identifying a position, in the frequency scan order, of a frequency associated with a last-acquired cell by using a measurement result of the frequency associated with the last-acquired cell that is stored in a measurement database, as described above.

As further shown in FIG. 6, in some aspects, process 600 may include performing the RLF recovery procedure by scanning one or more frequencies in the frequency scan order (block 620). For example, the UE (e.g., using communication manager 706, depicted in FIG. 7) may perform the RLF recovery procedure by scanning one or more frequencies in the frequency scan order, as described above.

Process 600 may include additional aspects, such as any single aspect or any combination of aspects described below and/or in connection with one or more other processes described elsewhere herein.

In a first aspect, identifying the position, in the frequency scan order, of the frequency associated with the last-acquired cell includes placing the frequency associated with the last-acquired cell at a first position in the frequency scan order in connection with the measurement result of the frequency associated with the last-acquired cell satisfying a measurement threshold, or placing the frequency associated with the last-acquired cell at a second position in the frequency scan order in connection with the measurement result of the frequency associated with the last-acquired cell not satisfying the measurement threshold, wherein the second position is lower in the frequency scan order than the first position.

In a second aspect, alone or in combination with the first aspect, identifying the frequency scan order includes sorting frequencies that are associated with both the measurement database and at least one of the frequency associated with the last-acquired cell, a frequency associated with a last-acquired neighbor cell, or one or more frequencies included in both a previously-acquired-cell database and a system-information-block-4-star database.

In a third aspect, alone or in combination with one or more of the first and second aspects, sorting the frequencies that are associated with both the measurement database and the at least one of the frequency associated with the last-acquired cell, the frequency associated with the last-acquired neighbor cell, or the one or more frequencies included in both the previously-acquired-cell database and the system-information-block-4-star database, includes identifying a first sorted subset by sorting a first subset of frequencies by bandwidth size based at least in part on measurement results associated with the first subset satisfying an RSRP threshold, identifying a second sorted subset by sorting a second subset of frequencies by measurement results based at least in part on measurement results associated with the second subset failing to satisfy the RSRP threshold, and placing the first sorted subset higher in the frequency scan order than the second sorted subset.

In a fourth aspect, alone or in combination with one or more of the first through third aspects, identifying the frequency scan order includes sorting a subset of frequencies that are associated with both a previously-acquired-cell database and a system-information-block-4-star database by bandwidth size.

In a fifth aspect, alone or in combination with one or more of the first through fourth aspects, identifying the frequency scan order includes sorting a subset of frequencies associated with a previously-acquired-cell database by bandwidth size.

In a sixth aspect, alone or in combination with one or more of the first through fifth aspects, identifying the frequency scan order includes for a first subset of frequencies having measurement results in the measurement database that satisfy an RSRP threshold, placing time division duplex frequencies higher in the frequency scan order than frequency division duplex frequencies, for a second subset of frequencies having measurement results in the measurement database that do not satisfy the RSRP threshold, sorting the second subset of frequencies by measurement results, and placing the first subset of frequencies higher in the frequency scan order than the second set of frequencies.

In a seventh aspect, alone or in combination with one or more of the first through sixth aspects, identifying the frequency scan order includes sorting a subset of frequencies associated with a system-information-block-4-star database by placing time division duplex frequencies higher in the frequency scan order than frequency division duplex frequencies.

In an eighth aspect, alone or in combination with one or more of the first through seventh aspects, identifying the frequency scan order includes sorting a subset of frequencies included in a high-speed-train database that have measurement results in the measurement database by measurement results.

In a ninth aspect, alone or in combination with one or more of the first through eighth aspects, process 600 includes receiving a measurement configuration that configures measurement, by the UE, of frequencies associated with one or more neighboring cells, measuring the one or more frequencies, resulting in one or more measurement results, storing the one or more measurement results in the measurement database, and retaining one or more previously acquired measurement results in the measurement database, wherein the one or more previously acquired measurement results are associated with one or more frequencies not configured for measurement by the measurement configuration.

In a tenth aspect, alone or in combination with one or more of the first through ninth aspects, process 600 includes receiving a first measurement configuration that configures measurement, by the UE, of a first group of one or more neighboring cells, receiving a second measurement configuration that configures measurement, by the UE, of a second group of one or more neighboring cells, identifying that a first neighboring cell, of the first group of one or more neighboring cells, is a same cell as a second neighboring cell, of the second group of one or more neighboring cells, and retaining a previously acquired measurement result associated with the first neighboring cell in the measurement database based at least in part on identifying that the first neighboring cell is the same cell as the second neighboring cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
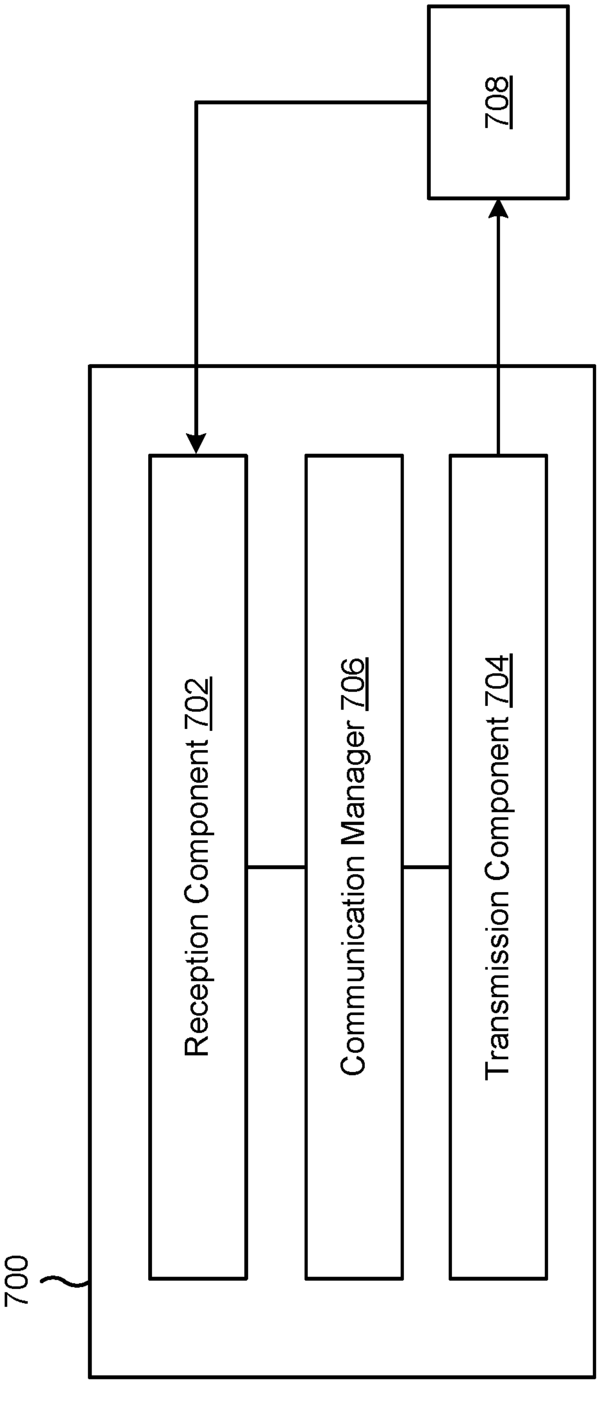
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702, a transmission component 704, and/or a communication manager 706, which may be in communication with one another (for example, via one or more buses and/or one or more other components). In some aspects, the communication manager 706 is the communication manager 140 described in connection with FIG. 1. As shown, the apparatus 700 may communicate with another apparatus 708, such as a UE or a network node (such as a CU, a DU, an RU, or a base station), using the reception component 702 and the transmission component 704.

In some aspects, the apparatus 700 may be configured to perform one or more operations described herein in connection with FIGS. 5A-5G. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE 120 described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 702 may receive communications, such as reference signals, control information, data communications, or a combination thereof, from the apparatus 708. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, one or more modems, one or more demodulators, one or more MIMO detectors, one or more receive processors, one or more controllers/processors, one or more memories, or a combination thereof, of the UE 120 described in connection with FIG. 2.

The transmission component 704 may transmit communications, such as reference signals, control information, data communications, or a combination thereof, to the apparatus 708. In some aspects, one or more other components of the apparatus 700 may generate communications and may provide the generated communications to the transmission component 704 for transmission to the apparatus 708. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 704 may include one or more antennas, one or more modems, one or more modulators, one or more transmit MIMO processors, one or more transmit processors, one or more controllers/processors, one or more memories, or a combination thereof, of the UE 120 described in connection with FIG. 2. In some aspects, the transmission component 704 may be co-located with the reception component 702 in one or more transceivers.

The communication manager 706 may support operations of the reception component 702 and/or the transmission component 704. For example, the communication manager 706 may receive information associated with configuring reception of communications by the reception component 702 and/or transmission of communications by the transmission component 704. Additionally, or alternatively, the communication manager 706 may generate and/or provide control information to the reception component 702 and/or the transmission component 704 to control reception and/or transmission of communications.

The communication manager 706 may identify a frequency scan order associated with an RLF recovery procedure, wherein identifying the frequency scan order includes identifying a position, in the frequency scan order, of a frequency associated with a last-acquired cell by using a measurement result of the frequency associated with the last-acquired cell that is stored in a measurement database. The communication manager 706 may perform the RLF recovery procedure by scanning one or more frequencies in the frequency scan order.

The reception component 702 may receive a measurement configuration that configures measurement of frequencies associated with one or more neighboring cells.

The communication manager 706 may measure the one or more frequencies, resulting in one or more measurement results.

The communication manager 706 may store the one or more measurement results in the measurement database.

The communication manager 706 may retain one or more previously acquired measurement results in the measurement database, wherein the one or more previously acquired measurement results are associated with one or more frequencies not configured for measurement by the measurement configuration.

The reception component 702 may receive a first measurement configuration that configures measurement of a first group of one or more neighboring cells.

The reception component 702 may receive a second measurement configuration that configures measurement of a second group of one or more neighboring cells.

The communication manager 706 may identify that a first neighboring cell, of the first group of one or more neighboring cells, is a same cell as a second neighboring cell, of the second group of one or more neighboring cells.

The communication manager 706 may retain a previously acquired measurement result associated with the first neighboring cell in the measurement database based at least in part on identifying that the first neighboring cell is the same cell as the second neighboring cell.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: identifying a frequency scan order associated with a radio link failure (RLF) recovery procedure, wherein identifying the frequency scan order includes identifying a position, in the frequency scan order, of a frequency associated with a last-acquired cell by using a measurement result of the frequency associated with the last-acquired cell that is stored in a measurement database; and performing the RLF recovery procedure by scanning one or more frequencies in the frequency scan order.

Aspect 2: The method of Aspect 1, wherein identifying the position, in the frequency scan order, of the frequency associated with the last-acquired cell includes: placing the frequency associated with the last-acquired cell at a first position in the frequency scan order in connection with the measurement result of the frequency associated with the last-acquired cell satisfying a measurement threshold; or placing the frequency associated with the last-acquired cell at a second position in the frequency scan order in connection with the measurement result of the frequency associated with the last-acquired cell not satisfying the measurement threshold, wherein the second position is lower in the frequency scan order than the first position.

Aspect 3: The method of any of Aspects 1-2, wherein identifying the frequency scan order includes sorting frequencies that are associated with both the measurement database and at least one of: the frequency associated with the last-acquired cell, a frequency associated with a last-acquired neighbor cell, or one or more frequencies included in both a previously-acquired-cell database and a system-information-block-4-star database.

Aspect 4: The method of Aspect 3, wherein sorting the frequencies that are associated with both the measurement database and the at least one of the frequency associated with the last-acquired cell, the frequency associated with the last-acquired neighbor cell, or the one or more frequencies included in both the previously-acquired-cell database and the system-information-block-4-star database, includes: identifying a first sorted subset by sorting a first subset of frequencies by bandwidth size based at least in part on measurement results associated with the first subset satisfying a reference signal receiving power (RSRP) threshold, identifying a second sorted subset by sorting a second subset of frequencies by measurement results based at least in part on measurement results associated with the second subset failing to satisfy the RSRP threshold, and placing the first sorted subset higher in the frequency scan order than the second sorted subset.

Aspect 5: The method of any of Aspects 1-4, wherein identifying the frequency scan order includes sorting a subset of frequencies that are associated with both a previously-acquired-cell database and a system-information-block-4-star database by bandwidth size.

Aspect 6: The method of any of Aspects 1-5, wherein identifying the frequency scan order includes sorting a subset of frequencies associated with a previously-acquired-cell database by bandwidth size.

Aspect 7: The method of any of Aspects 1-6, wherein identifying the frequency scan order includes: for a first subset of frequencies having measurement results in the measurement database that satisfy a reference signal received power (RSRP) threshold, placing time division duplex frequencies higher in the frequency scan order than frequency division duplex frequencies, for a second subset of frequencies having measurement results in the measurement database that do not satisfy the RSRP threshold, sorting the second subset of frequencies by measurement results, and placing the first subset of frequencies higher in the frequency scan order than the second set of frequencies.

Aspect 8: The method of any of Aspects 1-7, wherein identifying the frequency scan order includes sorting a subset of frequencies associated with a system-information-block-4-star database by placing time division duplex frequencies higher in the frequency scan order than frequency division duplex frequencies.

Aspect 9: The method of any of Aspects 1-8, wherein identifying the frequency scan order includes sorting a subset of frequencies included in a high-speed-train database that have measurement results in the measurement database by measurement results.

Aspect 10: The method of any of Aspects 1-9, further comprising: receiving a measurement configuration that configures measurement, by the UE, of frequencies associated with one or more neighboring cells; measuring the one or more frequencies, resulting in one or more measurement results; storing the one or more measurement results in the measurement database; and retaining one or more previously acquired measurement results in the measurement database, wherein the one or more previously acquired measurement results are associated with one or more frequencies not configured for measurement by the measurement configuration.

Aspect 11: The method of any of Aspects 1-10, further comprising: receiving a first measurement configuration that configures measurement, by the UE, of a first group of one or more neighboring cells; receiving a second measurement configuration that configures measurement, by the UE, of a second group of one or more neighboring cells; identifying that a first neighboring cell, of the first group of one or more neighboring cells, is a same cell as a second neighboring cell, of the second group of one or more neighboring cells; and retaining a previously acquired measurement result associated with the first neighboring cell in the measurement database based at least in part on identifying that the first neighboring cell is the same cell as the second neighboring cell.

Aspect 12: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-11.

Aspect 13: An apparatus for wireless communication at a device, the apparatus comprising one or more memories and one or more processors coupled to the one or more memories, the one or more processors configured to cause the device to perform the method of one or more of Aspects 1-11.

Aspect 14: An apparatus for wireless communication, the apparatus comprising at least one means for performing the method of one or more of Aspects 1-11.

Aspect 15: A non-transitory computer-readable medium storing code for wireless communication, the code comprising instructions executable by one or more processors to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

Aspect 17: A device for wireless communication, the device comprising a processing system that includes one or more processors and one or more memories coupled with the one or more processors, the processing system configured to cause the device to perform the method of one or more of Aspects 1-11.

Aspect 18: An apparatus for wireless communication at a device, the apparatus comprising one or more memories and one or more processors coupled to the one or more memories, the one or more processors individually or collectively configured to cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to cause the UE to:

identify a frequency scan order associated with a radio link failure (RLF) recovery procedure, wherein identifying the frequency scan order includes identifying a position, in the frequency scan order, of a frequency associated with a last-acquired cell by using a measurement result of the frequency associated with the last-acquired cell that is stored in a measurement database, and wherein for a first subset of frequencies having measurement results in the measurement database that satisfy a reference signal received power (RSRP) threshold, placing time division duplex frequencies higher in the frequency scan order than frequency division duplex frequencies; and perform the RLF recovery procedure by scanning one or more frequencies in the frequency scan order.

2. The apparatus of claim 1, wherein the one or more processors, to cause the UE to identify the position, in the frequency scan order, of the frequency associated with the last-acquired cell, are configured to cause the UE to:

place the frequency associated with the last-acquired cell at a first position in the frequency scan order in connection with the measurement result of the frequency associated with the last-acquired cell satisfying a measurement threshold; or place the frequency associated with the last-acquired cell at a second position in the frequency scan order in connection with the measurement result of the frequency associated with the last-acquired cell not satisfying the measurement threshold, wherein the second position is lower in the frequency scan order than the first position.

3. The apparatus of claim 1, wherein the one or more processors, to cause the UE to identify the frequency scan order, are configured to cause the UE to sort frequencies that are associated with both the measurement database and at least one of:

the frequency associated with the last-acquired cell, a frequency associated with a last-acquired neighbor cell, or one or more frequencies included in both a previously-acquired-cell database and a system-information-block-4-star database.

4. The apparatus of claim 3, wherein the one or more processors, to cause the UE to sort the frequencies that are associated with both the measurement database and the at least one of the frequency associated with the last-acquired cell, the at least one of the frequency associated with the last-acquired neighbor cell, or the one or more frequencies included in both the previously-acquired-cell database and the system-information-block-4-star database, are configured to cause the UE to:

identify a first sorted subset by sorting a first subset of frequencies by bandwidth size based at least in part on measurement results associated with the first subset satisfying a reference signal receiving power (RSRP) threshold, identify a second sorted subset by sorting a second subset of frequencies by measurement results based at least in part on measurement results associated with the second subset failing to satisfy the RSRP threshold, and place the first sorted subset higher in the frequency scan order than the second sorted subset.

5. The apparatus of claim 1, wherein the one or more processors, to cause the UE to identify the frequency scan order, are configured to cause the UE to sort a subset of frequencies that are associated with both a previously-acquired-cell database and a system-information-block-4-star database by bandwidth size.

6. The apparatus of claim 1, wherein the one or more processors, to cause the UE to identify the frequency scan order, are configured to cause the UE to sort a subset of frequencies associated with a previously-acquired-cell database by bandwidth size.

7. The apparatus of claim 1, wherein the one or more processors, to cause the UE to identify the frequency scan order, are configured to cause the UE to:

for a second subset of frequencies having measurement results in the measurement database that do not satisfy the RSRP threshold, sorting the second subset of frequencies by measurement results, and placing the first subset of frequencies higher in the frequency scan order than the second subset of frequencies.

8. The apparatus of claim 1, wherein the one or more processors, to cause the UE to identify the frequency scan order, are configured to cause the UE to sort a subset of frequencies associated with a system-information-block-4-star database by placing time division duplex frequencies higher in the frequency scan order than frequency division duplex frequencies.

9. The apparatus of claim 1, wherein the one or more processors, to cause the UE to identify the frequency scan order, are configured to cause the UE to sort a subset of frequencies included in a high-speed-train database that have measurement results in the measurement database by measurement results.

10. The apparatus of claim 1, wherein the one or more processors are further configured to cause the UE to:

receive a measurement configuration that configures measurement of frequencies associated with one or more neighboring cells;

measure the one or more frequencies, resulting in one or more measurement results;

store the one or more measurement results in the measurement database; and retain one or more previously acquired measurement results in the measurement database, wherein the one or more previously acquired measurement results are associated with one or more frequencies not configured for measurement by the measurement configuration.

11. The apparatus of claim 1, wherein the one or more processors are further configured to cause the UE to:

receive a first measurement configuration that configures measurement, by the UE, of a first group of one or more neighboring cells;

receive a second measurement configuration that configures measurement, by the UE, of a second group of one or more neighboring cells;

identify that a first neighboring cell, of the first group of one or more neighboring cells, is a same cell as a second neighboring cell, of the second group of one or more neighboring cells; and retain a previously acquired measurement result associated with the first neighboring cell in the measurement database based at least in part on identifying that the first neighboring cell is the same cell as the second neighboring cell.

12. A method of wireless communication performed by a user equipment (UE), comprising:

identifying a frequency scan order associated with a radio link failure (RLF) recovery procedure, wherein identifying the frequency scan order includes identifying a position, in the frequency scan order, of a frequency associated with a last-acquired cell by using a measurement result of the frequency associated with the last-acquired cell that is stored in a measurement database, and wherein for a first subset of frequencies having measurement results in the measurement database that satisfy a reference signal received power (RSRP) threshold, placing time division duplex frequencies higher in the frequency scan order than frequency division duplex frequencies; and performing the RLF recovery procedure by scanning one or more frequencies in the frequency scan order.

13. The method of claim 12, wherein identifying the position, in the frequency scan order, of the frequency associated with the last-acquired cell includes:

placing the frequency associated with the last-acquired cell at a first position in the frequency scan order in connection with the measurement result of the frequency associated with the last-acquired cell satisfying a measurement threshold; or placing the frequency associated with the last-acquired cell at a second position in the frequency scan order in connection with the measurement result of the frequency associated with the last-acquired cell not satisfying the measurement threshold, wherein the second position is lower in the frequency scan order than the first position.

14. The method of claim 12, wherein identifying the frequency scan order includes sorting frequencies that are associated with both the measurement database and at least one of:

the frequency associated with the last-acquired cell, a frequency associated with a last-acquired neighbor cell, or one or more frequencies included in both a previously-acquired-cell database and a system-information-block-4-star database.

15. The method of claim 14, wherein sorting the frequencies that are associated with both the measurement database and the at least one of the frequency associated with the last-acquired cell, the at least one of the frequency associated with the last-acquired neighbor cell, or the one or more frequencies included in both the previously-acquired-cell database and the system-information-block-4-star database, includes:

identifying a first sorted subset by sorting a first subset of frequencies by bandwidth size based at least in part on measurement results associated with the first subset satisfying a reference signal receiving power (RSRP) threshold, identifying a second sorted subset by sorting a second subset of frequencies by measurement results based at least in part on measurement results associated with the second subset failing to satisfy the RSRP threshold, and placing the first sorted subset higher in the frequency scan order than the second sorted subset.

16. The method of claim 12, wherein identifying the frequency scan order includes sorting a subset of frequencies that are associated with both a previously-acquired-cell database and a system-information-block-4-star database by bandwidth size.

17. The method of claim 12, wherein identifying the frequency scan order includes sorting a subset of frequencies associated with a previously-acquired-cell database by bandwidth size.

18. The method of claim 12, wherein identifying the frequency scan order includes:

for a second subset of frequencies having measurement results in the measurement database that do not satisfy the RSRP threshold, sorting the second subset of frequencies by measurement results, and placing the first subset of frequencies higher in the frequency scan order than the second subset of frequencies.

19. The method of claim 12, wherein identifying the frequency scan order includes sorting a subset of frequencies associated with a system-information-block-4-star database by placing time division duplex frequencies higher in the frequency scan order than frequency division duplex frequencies.

20. The method of claim 12, wherein identifying the frequency scan order includes sorting a subset of frequencies included in a high-speed-train database that have measurement results in the measurement database by measurement results.

21. The method of claim 12, further comprising:

receiving a measurement configuration that configures measurement, by the UE, of frequencies associated with one or more neighboring cells;

measuring the one or more frequencies, resulting in one or more measurement results;

storing the one or more measurement results in the measurement database; and retaining one or more previously acquired measurement results in the measurement database, wherein the one or more previously acquired measurement results are associated with one or more frequencies not configured for measurement by the measurement configuration.

22. The method of claim 12, further comprising:

receiving a first measurement configuration that configures measurement, by the UE, of a first group of one or more neighboring cells;

receiving a second measurement configuration that configures measurement, by the UE, of a second group of one or more neighboring cells;

identifying that a first neighboring cell, of the first group of one or more neighboring cells, is a same cell as a second neighboring cell, of the second group of one or more neighboring cells; and retaining a previously acquired measurement result associated with the first neighboring cell in the measurement database based at least in part on identifying that the first neighboring cell is the same cell as the second neighboring cell.

23. A non-transitory computer-readable medium storing a set of instructions for wireless communication, the set of instructions comprising:

one or more instructions that, when executed by one or more processors of a user equipment (UE), cause the UE to:

identify a frequency scan order associated with a radio link failure (RLF) recovery procedure, wherein identifying the frequency scan order includes identifying a position, in the frequency scan order, of a frequency associated with a last-acquired cell by using a measurement result of the frequency associated with the last-acquired cell that is stored in a measurement database, and wherein for a first subset of frequencies having measurement results in the measurement database that satisfy a reference signal received power (RSRP) threshold, placing time division duplex frequencies higher in the frequency scan order than frequency division duplex frequencies; and perform the RLF recovery procedure by scanning one or more frequencies in the frequency scan order.

24. The non-transitory computer-readable medium of claim 23, wherein the one or more instructions, that cause the UE to identify the position, in the frequency scan order, of the frequency associated with the last-acquired cell, cause the UE to:

place the frequency associated with the last-acquired cell at a first position in the frequency scan order in connection with the measurement result of the frequency associated with the last-acquired cell satisfying a measurement threshold; or place the frequency associated with the last-acquired cell at a second position in the frequency scan order in connection with the measurement result of the frequency associated with the last-acquired cell not satisfying the measurement threshold, wherein the second position is lower in the frequency scan order than the first position.

25. The non-transitory computer-readable medium of claim 23, wherein the one or more instructions, that cause the UE to identify the frequency scan order, cause the UE to sort frequencies that are associated with both the measurement database and at least one of:

the frequency associated with the last-acquired cell, a frequency associated with a last-acquired neighbor cell, or one or more frequencies included in both a previously-acquired-cell database and a system-information-block-4-star database.

26. The non-transitory computer-readable medium of claim 25, wherein the one or more instructions, that cause the UE to sort the frequencies that are associated with both the measurement database and the at least one of the frequency associated with the last-acquired cell, the frequency associated with the last-acquired neighbor cell, or the one or more frequencies included in both the previously-acquired-cell database and the system-information-block-4-star database, cause the UE to:

identify a first sorted subset by sorting a first subset of frequencies by bandwidth size based at least in part on measurement results associated with the first subset satisfying a reference signal receiving power (RSRP) threshold, identify a second sorted subset by sorting a second subset of frequencies by measurement results based at least in part on measurement results associated with the second subset failing to satisfy the RSRP threshold, and place the first sorted subset higher in the frequency scan order than the second sorted subset.

27. The non-transitory computer-readable medium of claim 23, wherein the one or more instructions, that cause the UE to identify the frequency scan order, cause the UE to sort a subset of frequencies that are associated with both a previously-acquired-cell database and a system-information-block-4-star database by bandwidth size.

28. The non-transitory computer-readable medium of claim 23, wherein the one or more instructions, that cause the UE to identify the frequency scan order, cause the UE to sort a subset of frequencies associated with a previously-acquired-cell database by bandwidth size.

29. An apparatus for wireless communication, comprising:

means for identifying a frequency scan order associated with a radio link failure (RLF) recovery procedure, wherein identifying the frequency scan order includes identifying a position, in the frequency scan order, of a frequency associated with a last-acquired cell by using a measurement result of the frequency associated with the last-acquired cell that is stored in a measurement database, and wherein for a first subset of frequencies having measurement results in the measurement database that satisfy a reference signal received power (RSRP) threshold, placing time division duplex frequencies higher in the frequency scan order than frequency division duplex frequencies; and means for performing the RLF recovery procedure by scanning one or more frequencies in the frequency scan order.

30. The apparatus of claim 29, wherein the means for identifying the position, in the frequency scan order, of the frequency associated with the last-acquired cell includes:

means for placing the frequency associated with the last-acquired cell at a first position in the frequency scan order in connection with the measurement result of the frequency associated with the last-acquired cell satisfying a measurement threshold; or means for placing the frequency associated with the last-acquired cell at a second position in the frequency scan order in connection with the measurement result of the frequency associated with the last-acquired cell not satisfying the measurement threshold, wherein the second position is lower in the frequency scan order than the first position.

* * * * *